US011443517B1

(12) United States Patent
Kalagher et al.

(10) Patent No.: US 11,443,517 B1
(45) Date of Patent: Sep. 13, 2022

(54) VIDEO-BASED PARKING GARAGE MONITORING

(71) Applicant: Alarm.com Incorporated, Tysons, VA (US)

(72) Inventors: Mary Melissa Kalagher, Tysons, VA (US); Dana Eubanks, Tysons, VA (US); Vanessa Bishop, Tysons, VA (US)

(73) Assignee: Alarm.com Incorporated, Tysons, VA (US)

( * ) Notice: Subject to any disclaimer, the term of this patent is extended or adjusted under 35 U.S.C. 154(b) by 46 days.

(21) Appl. No.: 16/993,966

(22) Filed: Aug. 14, 2020

Related U.S. Application Data

(60) Provisional application No. 62/888,809, filed on Aug. 19, 2019.

(51) Int. Cl.
G06V 20/52 (2022.01)
G06T 7/73 (2017.01)
B60W 50/14 (2020.01)
H04W 4/12 (2009.01)
H04W 4/021 (2018.01)
G06V 10/60 (2022.01)

(52) U.S. Cl.
CPC ............. G06V 20/52 (2022.01); B60W 50/14 (2013.01); G06T 7/74 (2017.01); G06V 10/60 (2022.01); H04W 4/021 (2013.01); H04W 4/12 (2013.01); B60W 2050/146 (2013.01); G06T 2207/30232 (2013.01); G06T 2210/12 (2013.01); G06V 2201/08 (2022.01)

(58) Field of Classification Search
CPC ............. G06K 9/00771; G06K 9/4661; G06K 2209/23; B60W 50/14; B60W 2050/146; G06T 7/74; G06T 2207/30232; G06T 2210/12; H04W 4/021; H04W 4/12
See application file for complete search history.

(56) References Cited

U.S. PATENT DOCUMENTS 9,120,425 B2 9/2015 Tate, Jr. et al.
9,773,413 B1 9/2017 Li et al.
10,613,219 B1* 4/2020 DeCia ................... G01S 13/931
10,846,960 B1* 11/2020 Lemberger ......... G06K 9/00771
(Continued)

FOREIGN PATENT DOCUMENTS

WO WO2015003899 1/2015

Primary Examiner — Nasim N Nirjhar
(74) Attorney, Agent, or Firm — Fish & Richardson P.C.

(57) ABSTRACT

Methods, systems, and apparatus, including computer programs encoded on a storage device, are disclosed. A system includes one or more processors and one or more computer storage media storing instructions that are operable, when executed by the one or more processors, to cause the one or more processors to perform operations. The operations include: obtaining an image from a camera coupled to a garage; determining that a garage door has opened; in response to determining that the garage door has opened, determining that a vehicle position satisfies an alert criteria based on the image from the camera; and in response to determining that the vehicle position satisfies the alert criteria based on the image from the camera, providing a visual alert for a driver of the vehicle on a signaling device coupled to the garage.

19 Claims, 4 Drawing Sheets

(56) References Cited

U.S. PATENT DOCUMENTS

| | | | |
|---|---|---|---|
| 2015/0248772 A1* | 9/2015 | Gove | G06K 9/00771 |
| | | | 348/158 |
| 2017/0154482 A1 | 6/2017 | Osborne | |
| 2018/0281858 A1* | 10/2018 | Griffith | G05D 1/0246 |
| 2019/0287407 A1* | 9/2019 | Branscombe | G08G 1/164 |
| 2020/0070725 A1* | 3/2020 | Ding | B60W 50/16 |
| 2020/0320318 A1* | 10/2020 | Ramaglia | G06T 7/50 |

* cited by examiner

VIDEO-BASED PARKING GARAGE MONITORING

CROSS-REFERENCE TO RELATED APPLICATION

This application claims the benefit of U.S. Application No. 62/888,809, filed Aug. 19, 2019, which is incorporated by reference in its entirety.

TECHNICAL FIELD

This disclosure application relates generally to property monitoring systems with video cameras.

BACKGROUND

This disclosure application relates generally to property monitoring systems with video cameras. Many properties are equipped with monitoring systems that include sensors and connected system components. Some monitoring systems include cameras that may be configured to detect events and then take action in response to the detection of the events. Cameras and other monitoring devices are often dispersed at various locations at a property such as a home or commercial business.

SUMMARY

Many residents and homeowners equip their properties with monitoring systems to enhance the security, safety, or convenience of their properties. The property monitoring systems can include video cameras, which obtain visual images of scenes at the property.

Property monitoring systems can determine the location of vehicles in or near a vehicle garage based on images from video cameras. Property monitoring systems can monitor conditions in a vehicle garage and generate notifications for anomalies detected in the garage. For example, property monitoring systems can send notifications to users indicating that an object is in the garage that is not typically in the garage, or that an object is out of place within the garage.

Property monitoring systems can also assist drivers in parking vehicles in the garage based on images from video cameras. For example, property monitoring systems can track a vehicle as the vehicle enters or exits the garage. Property monitoring systems can provide visual and/or audible signals to a driver to indicate that the driver should maneuver the vehicle in a particular manner. For example, the visual and/or audible signals can indicate to the driver that the driver should maneuver the vehicle by slowing, stopping, turning left, or turning right.

Property monitoring systems can monitor vehicles for potential maintenance issues based on video images from video cameras. For example, property monitoring systems can monitor vehicle lights that illuminate while the vehicle maneuvers in the garage. The property monitoring system can notify the driver if there are anomalies in the lighting pattern of the vehicle. For example, the property monitoring system can notify the driver if a brake light or tail light fails to illuminate when expected.

The details of one or more implementations of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

A property, such as a house or a place of business, can be equipped with a monitoring system to enhance the security of the property. The property monitoring system may include one or more sensors, such as motion detectors, microphones, or temperature sensors, distributed about the property to monitor conditions at the property. In many cases, the property monitoring system also includes one or more controls, which enable automation of various property actions, such as locking/unlocking a door, adjusting lighting conditions, or adjusting the temperature at the property. The property monitoring system can also include a control unit and one or more video recording devices, e.g., video cameras, that are each configured to provide information to a monitoring server of the system. The various components of the property monitoring system can be located interior to the property, exterior to the property, and/or in a vehicle garage at the property. The vehicle garage may be part of the same building structure as the property, or may be a separate building structure near the property. The monitoring server can use the information from various components of the property monitoring system to generate alerts and notifications related to conditions in the vehicle garage, and to control and configure devices in the garage.

Figure 1:
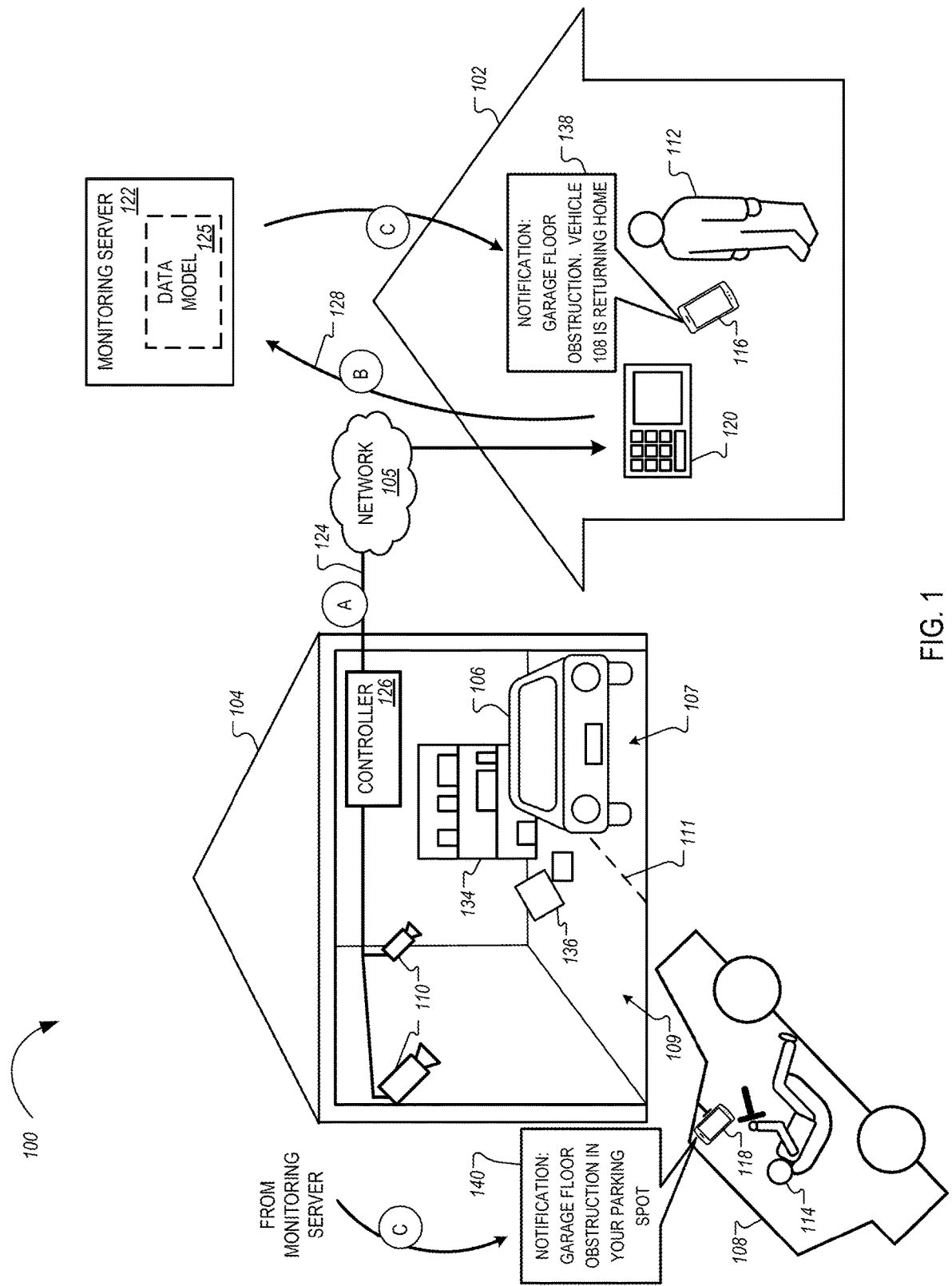
FIG. 1 shows a block diagram of an example system for monitoring a garage at a property.

FIG. 1 shows a block diagram of an example system 100 for monitoring a vehicle garage 104 at a property 102. The property 102 may be a home, another residence, a place of business, a public space, or another facility that is monitored by a monitoring system. The garage 104 is a separate building structure that is located near the property 102.

The system 100 can include one or more video cameras 110 and a controller 126. The video cameras 110 can be electronic devices configured to obtain video or image data of various rooms and sections of property 102, e.g., the garage 104. The controller 126 can be a device that controls the functions of the video cameras 110.

The system 100 includes a control unit 120 that receives video data 124 obtained using the video cameras 110 and sends the video data 124 to a remote monitoring server 122. In some examples, the video cameras 110 and the controller 126 communicate electronically with the control unit 120 through a network 105. In some examples, the video cameras 110 and/or the controller 126 can send the video data 124 directly to the remote monitoring server 122.

The network 105 may be any communication infrastructure that supports the electronic exchange of data between the control unit 120, the video cameras 110, and the controller 126. The network 105 may include a local area network (LAN), a wide area network (WAN), the Internet, or other network topology. The network 105 may be any one or combination of wireless or wired networks and may include any one or more of Ethernet, cellular telephony, Bluetooth, Wi-Fi, Z-Wave, ZigBee, Bluetooth, and Bluetooth LE technologies. In some implementations, the network 105 may include optical data links. To support communications through the network 105, one or more devices of the monitoring system may include communications modules, such as a modem, transceiver, modulator, or other hardware or software configured to enable the device to communicate electronic data through the network 105.

The control unit 120 may be a computer system or other electronic device configured to communicate with components of the monitoring system to cause various functions to be performed for the monitoring system. The control unit 120 may include a processor, a chipset, a memory system, or other computing hardware. In some cases, the control unit 120 may include application-specific hardware, such as a field-programmable gate array (FPGA), an application-specific integrated circuit (ASIC), or other embedded or dedicated hardware. The control unit 120 may include software, which configures the unit to perform the functions described in this disclosure. In some implementations, a resident 112, 114, of the property 102, or another user, communicates with the control unit 120 through a physical connection (e.g., touch screen, keypad, etc.) and/or network connection. In some implementations, the resident 112, 114 or other user communicates with the control unit 120 through a software ("smart home") application installed on mobile devices 116, 118.

The video cameras 110 send various video data 124 to the control unit 120. In some examples, the video cameras 110 may send the various video data 124 directly to the monitoring server 122. The video data 124 transmitted by the video cameras 110 can be encoded in radio signals transmitted by the sensing components of the video cameras 110.

The control unit 120 can communicate with one or more home automation controls of the property 102 to control the operation of home automation devices at the property. For example, control unit 120 can manage operation of one or more of a thermostat, a humidifier, door locks, interior or exterior lights, as well as operation of the video cameras 110 and the controller 126.

In some implementations, the control unit 120 and/or the monitoring server 122 communicates with an authorized user mobile device 116, 118, possibly through the network 105. The user mobile devices 116, 118 may each be associated with a person, such as the residents 112, 114. The mobile devices 116, 118 may be, for example, portable personal computing devices, such as a cellphone, a smartphone, a tablet, a laptop, or other electronic device. In some examples, the mobile device 116, 118 is an electronic home assistant or a smart speaker.

The system 100 communicates with the monitoring server 122, which may be remote from the property 102. The monitoring server 122 can be, for example, one or more computer systems, server systems, or other computing devices. In some implementations, the monitoring server 122 is a cloud computing platform. In some examples, the monitoring server 122 communicates with various components of the monitoring system through the control unit 120. In some examples, the monitoring server 122 may communicate directly with various components of the monitoring system, e.g., the video cameras 110 and/or the controller 126.

The control unit 120 communicates with the monitoring server 122 via a long-range data link. The long-range data link can include any combination of wired and wireless data networks. For example, the control unit 120 may exchange information with the monitoring server 122 through a wide-area-network (WAN), a cellular telephony network, a cable connection, a digital subscriber line (DSL), a satellite connection, or other electronic means for data transmission. The control unit 120 and the monitoring server 122 may exchange information using any one or more of various communication synchronous or asynchronous protocols, including the 802.11 family of protocols, GSM, 3G, 4G, 5G, LTE, CDMA-based data exchange or other techniques.

The residents 112, 114 of the property 102 may be, for example, property owners, tenants, or long-term guests of the property 102. The garage 104 is a two-car garage. The residents 112, 114 routinely park two vehicles 106, 108 in the garage 104. The resident 112 routinely drives the vehicle 106, and routinely parks the vehicle 106 in the right side parking spot 107 of the garage 104. The resident 112 uses the mobile device 116. The resident 114 routinely drives the vehicle 108, and routinely parks the vehicle 108 in the left side parking spot 109 of the garage 104. The resident 114 uses the mobile device 118.

The monitoring system includes two video cameras 110 installed inside the garage 104. The video cameras 110 each have a field of view of greater than seventy, eight, ninety, or some other number of degrees. The video cameras 110 are mounted in the garage 104 such that the combined fields of view of the video cameras 110 include the entire interior of the garage 104. Larger sized garages may require greater numbers of video cameras 110.

Each video camera 110 may include an embedded computer with video analytics software. The video analytics software may use image segmentation or other computer vision technology to map the floor plan of the garage. For example, the video cameras 110 can use computer vision technology to locate the front wall of the garage 104. In some examples, the residents 112, 114 may use a software interface to input the front wall location into the analytics software. The analytics software can create a virtual line crossing, or video tripwire at a configurable distance from boundaries within the garage, e.g., the front wall. When the vehicles 106, 108 maneuver inside the garage 104, the analytics software tracks the vehicles 106, 108 in the garage 104 and creates a bounding box around each vehicle. If an edge of the bounding box approaches within a configurable distance of a boundary such as the front wall, the video cameras 110 send an alert to the controller 126.

The video cameras 110 can use computer vision technology to identify parking spots in the garage 104, e.g., the right side parking spot 107 and the left side parking spot 109. The parking spots 107, 109 can be defined by boundaries at configurable distances from the front wall and the side walls of the garage 104. The parking spots 107, 109 can also be defined by a boundary 111 between the parking spots 107, 109. The video cameras 110 can establish the boundary 111 based on, for example, the typical positions of the vehicles 106, 108 in the garage 104. In some examples, the video cameras 110 may establish the boundary 111 based on input from the residents 112, 114. For example, the residents 112, 114 may input the widths of the vehicles 106, 108, into the analytics software. The residents 112, 114 may also input an assigned parking spot 107, 109 to each vehicle 106, 108. The video cameras 110 may establish the boundary 111 such that the boundary 111 allows more room for the wider of the vehicles 106, 108. The video cameras 110 may dynamically adjust the boundary 111 if one of the vehicles 106, 108 parks in an unusual position. For example, the video camera 110 can adjust the boundary 111 to the left if the vehicle 106 parks more closely than usual to the right side of the boundary 111.

The video cameras 110 can use image segmentation or other computer vision technology to map the edges of the garage 104 opening, and to identify objects within the garage 104. For example, objects may include shelves 134 containing storage boxes. Other objects in the garage 104 may include home maintenance tools and recreational equipment. The video cameras 110 can identify the objects in the garage 104 and can create bounding box rules and/or video tripwires or areas of interest around the objects, such that an alert is sent to the controller 126 if either of the vehicles 106, 108 cross the tripwires or enter the area of interest. If the objects are removed from the garage 104, the video cameras 110 can delete the video tripwires or area of interest.

In some examples, the video cameras 110 can establish a greater boundary to certain objects in the garage 104 compared to other objects. For example, a refrigerator or a breaker box may have a door that swings open. The video cameras 110 can establish a greater boundary to the refrigerator and/or breaker box to allow enough space for the door to swing open. The video cameras 110 may determine to establish a greater boundary to the refrigerator and the breaker box based on input from the residents 112, 114. The video cameras 110 may also determine to establish a greater boundary to the refrigerator and the breaker box based on visual image data. For example, the video cameras 110 may routinely collect images of the residents 112, 114 opening the refrigerator door. The video cameras 110 can analyze the images to determine to establish a boundary around the refrigerator that allows for opening the refrigerator door. For example, the video cameras 110 can analyze the images to determine a swinging radius of the refrigerator door. The video cameras 110 can then establish a boundary around the refrigerator that encompasses the refrigerator and the radius of the swinging refrigerator door.

The video cameras 110 can use computer vision technology to identify people and pets in the garage 104. The video cameras 110 may be able to identify people, for example, using facial recognition. The video cameras 110 can further identify people based on the locations of the vehicles 106, 108. For example, if the vehicle 106 parks in the garage 104 and one person exits the vehicle 106, the video cameras 110 can determine that the person is the resident 112 based on system settings and historical data trends. System settings may have the resident 112 assigned to the vehicle 106. Historical video data trends can indicate that video data from the garage 104 typically indicates the resident 112 driving the vehicle 106. The video cameras 110 may confirm that the person is the resident 112 based on facial recognition.

The video cameras 110 can use computer vision technology to identify vehicles in the garage, e.g., the vehicles 106, 108. For example, the video cameras 110 may identify the size, shape, color, and lighting configurations of the vehicles 106, 108. The video cameras 110 may also perform optical character recognition to read the license plates of the vehicles 106, 108.

The video cameras 110 can use computer vision technology to determine if a vehicle is moving into or out of the garage 104, or remaining stationary. The video cameras 110 can determine the motion of the vehicles 106, 108, for example, by analyzing sequential video frames to detect for changes due to vehicle motion.

The video cameras 110 can use computer vision technology to determine an open status of the garage door. The video cameras 110 can determine if the garage door is open, shut, or partially open. The video cameras 110 can determine the open status of the garage door, for example, based on lighting levels at the garage door opening. For example, the system may be calibrated to illumination levels that are typical for when the garage door is closed and for when the garage door is open. Illumination levels in the garage may vary depending on weather conditions. The system can receive information indicating current weather conditions. For example, the video cameras 110 can receive weather information, such as sunrise and sunset information, from the control unit 120. Based on the current weather conditions, the system can determine expected lighting levels in the garage.

In some examples, the video cameras 110 can determine if the garage door is open by comparing an image of the garage door opening to a known image of a the garage door in a closed position. For example, the cameras 110 can store a known image of the closed garage door. The cameras 110 can capture an image of the garage door opening, and compare the image of the garage door opening to the image of the closed garage door. If the images sufficiently match, the cameras 110 can determine that the garage door is closed. If the images do not sufficiently match, the cameras 110 can determine that the garage door is open.

In some examples, the video cameras 110 can determine if the garage door is open using object recognition. For example, the cameras 110 can store an image of a closed garage door, and an image of a driveway. When the cameras 110 recognize the object of the garage door within a captured image, the cameras 110 can determine that the garage door is shut. When the cameras 110 recognize the object of a driveway within a captured image, the cameras 110 can determine that the garage door is open, allowing the driveway to be visible to the cameras 110.

The video cameras 110 can use computer vision technology to identify obstructions in the parking spots 107, 109. For example, the video cameras 110 can determine if there are any objects on the floor of the garage 104 within the boundaries of the parking spots 107, 109. The video cameras 110 can also determine if there any objects are located in a path of a vehicle that is departing from the garage 104. For example, an object may be on the floor between the vehicle 106 and the garage door. The video cameras 110 can generate an alert if the garage door opens, indicating that the vehicle 106 may be about to depart the garage 104, while there is an object between the vehicle 106 and the garage door opening.

The video cameras 110 may be configured to detect animals. If an animal is observed in the garage 104, the software can generate an alert. An alert can also be generated if the animal is visible and then is not visible without exiting the garage 104, e.g., if the animal goes underneath a vehicle 106, 108. The video cameras 110 may be able to identify a pet in the garage 104 using animal facial recognition technology. The video cameras 110 can also detect and identify a pet in the garage 104 based on the pet's size, color, and movements.

The video cameras 110 can generate alerts based on the status of the garage door. The video cameras 110 can generate an alert if the garage door is shut, or partially shut, and a vehicle 106, 108 is moving in the garage 104. For example, the video cameras 110 can generate an alert if one of the vehicles 106, 108 starts to back out of the garage 104 while the garage door is shut.

In some examples, the monitoring server 122 can develop a floor plan, or map, of the garage 104 based on video data from the video cameras 110. The floor plan can include positions or locations of walls, doors, and objects in the garage 104. The monitoring server 122 can store the floor plan in a memory as a data model 125. The data model 125 can be a multi-dimensional model (e.g., 2D or 3D model) of the garage 104.

In some implementations, the garage monitoring system may undergo a calibration phase upon installation at the property 102. The calibration phase may include running video camera 110 calibration in the garage 104 when there are no vehicles in the garage 104. During the calibration phase, the video cameras 110 can use the video analytics software to establish a baseline image of the garage 104. The calibration phase may also include running video calibration in the garage 104 with the vehicles 106, 108 parked in their typical parking spots 107, 109. The video cameras 110 can use the video analytics software to establish a baseline image of the garage 104 with the parked vehicles 106, 108. The video cameras 110 can use the baseline images as reference to determine when there are anomalies such as obstructions on the floor of the garage 104. The video cameras 110 may perform recalibration periodically after installation and/or on-demand when requested by the residents 112, 114. For example, the residents 112, 114 may request video recalibration if after re-organizing the garage 104 or replacing one of the vehicles 106, 108 with a new vehicle.

FIG. 1 includes stages (A) through (C), which represent a flow of data. In stage (A) of FIG. 1, the video cameras 110 obtain video data 124 of the garage 104 at the property 102.

The video cameras 110 collect images of the vehicle 106 parked in the parking spot 107. The video cameras 110 collect images of the shelves 134. The video cameras 110 also collect images of boxes 136 on the floor of the parking spot 109. For example, the boxes 136 may have fallen from the shelves 134. The video cameras 110 also collect images of an open garage door.

The video cameras 110 perform video analysis on the collected images. The video cameras 110 determine that the vehicle 106 is parked in its typical parking spot 107. The video cameras 110 determine that the garage door is open, and that boxes 136 are on the floor in the parking spot 109. The video cameras 110 send the images to the controller 126. The video cameras 110 also send an alert to the controller 126 indicating that there is an obstruction on the floor of the garage 104. The controller 126 sends the video data 124, including the images and the alert, to the control unit 120. In some examples, the controller 126 sends the video data 124 directly to the monitoring server 122.

The control unit 120 and/or the monitoring server 122 receives or collects the video data 124. The video data 124 includes a combination of videos, still images, alerts, and other sensor data that include visual information about the locations of the vehicle 106, shelves 134, and other objects.

In some examples, the control unit 120 can send a command to the controller 126 to adjust the video cameras 110. For example, based on the video data 124, the control unit 120 can send a command to the controller 126 to maneuver the video cameras 110, to zoom the lenses in or out, and/or to create a boundary around an obstruction.

In stage (B) of FIG. 1, the control unit 120 sends monitoring system data 128 to the monitoring server 122 for analysis and determination of an action. The monitoring system data 128 can include the video data 124 collected by the one or more video cameras 110, data related to the controller 126, and/or other system data. For example, the control unit 120 may send monitoring system data 128 that includes video or still images captured by the video cameras 110 and additional cameras at the property 102, motion sensing data, energy usage data, and audio data. In some cases, the monitoring system data 128 is processed by the control unit 120 before being sent to the monitoring server 122. For example, the monitoring system data 128 may be filtered, down-sampled, annotated, or transformed. The control unit 120 can communicate electronically with the monitoring server 122 through a wireless network, such as a cellular telephony or data network, or through any of various communication protocols (e.g., GSM, LTE, CDMA, 3G, 4G, 5G, 802.11 family, etc.).

The monitoring server 122 analyzes the monitoring system data 128. For example, the monitoring server 122 can analyze the monitoring system data 128, including the video data 124, to determine the locations of the vehicles 106, 108. The monitoring server 122 can determine if the vehicles 106, 108 are located in the garage 104 based on vehicle recognition. The monitoring server 122 can use the data model 125 to determine if there is an anomaly in the garage 104. For example, the monitoring server 122 can determine and/or confirm that there are boxes 136 on the floor of the garage 104.

The monitoring server 122 may be able to determine the locations of the vehicles that are not in the garage 104. For example, the monitoring server 122 may receive GPS tracking data from the vehicle 108 when it is not in the garage 104. Based on GPS tracking data, the monitoring server 122 may be able to determine if the vehicle 108 is returning to the garage 104, and an expected time when the vehicle 108 is expected to arrive at the garage 104.

The monitoring server 122 may be able to determine the locations of the vehicles that are not in the garage 104 based on geofencing data. Geofencing data can indicate that vehicle 108 is located at or near the garage 104. In some cases, the geofencing data can be based on a connection between the vehicle 108 and other devices at or near the garage 104. For example, the geofencing data can be based on a Wi-Fi signal connecting to the vehicle 108 or a Bluetooth signal connecting to the vehicle 108.

The monitoring server 122 may be able to determine the locations of people who are in or near the garage 104 or driving the vehicles 106, 108. For example, if the vehicle 106 enters the garage 104 and one person exits the vehicle 106, the video cameras 110 may determine that the person is the resident 112 based on historical data trends, system settings, and/or facial recognition. Historical data trends can indicate that the resident 112 typically drives the vehicle 106. System settings may have the resident 112 assigned to the vehicle 106. Facial recognition may recognize the facial features of the resident 112. The mobile device 116, assigned to the resident 112 in the system settings, may automatically connect to the network 105.

After exiting the vehicle 106, the resident 112 may enter the property 102 and adjust one or more monitoring system settings. For example, the resident 112 may use the control unit 120 or the mobile device 116 to adjust a monitoring system status from "away, armed" to "stay, disarmed," and to adjust a thermostat to the resident 112's preferred temperature. Based on the data from the video cameras 110 and the monitoring system, the monitoring server 122 can determine that the resident 112 is at the property 102.

Similarly, if the video cameras 110 collect images of a person entering the garage 104 and driving the vehicle 108 out of the garage, the monitoring server 122 can determine that the person is the resident 114 based on historical data trends, system settings, and/or facial recognition. The monitoring server 122 can then determine that the resident 114 is driving the vehicle 108, and is not at the property 102.

In stage (C) of FIG. 1, based on analyzing the monitoring system data 128, the monitoring server 122 takes one or more actions. The monitoring server 122 may take one or more actions, e.g., based on pre-programmed rules and settings.

In some examples, the monitoring server 122 may take an action of sending a notification to one or more users, e.g., the residents 112, 114. For example, the monitoring server 122 can send notifications to the residents 112, 114 regarding the boxes 136 obstructing the garage floor. The monitoring server 122 can send a notification 138 to the resident 112, who is at the property 102, via the mobile device 116 and/or the control unit 120. The notification 138 may include the proximity of the vehicle 108 to the garage 104 and/or the amount of time expected until the vehicle 108 returns to the garage 104. The resident 112 may respond to the notification 138 by removing the boxes 136 from the garage floor before the vehicle 108 enters the garage 104.

In addition to, or instead of, sending the notification 138 to the resident 112, the monitoring server 122 can send a notification 140 to the resident 114, who is driving the vehicle 108. The monitoring server 122 can send the notification 140 to the resident 114 via the mobile device 118 and/or to a dashboard display of the vehicle 108. The notification 140 may include the location of the obstruction, e.g., that the obstruction is in the parking spot 109. The resident 114 may respond to the notification 140 by parking the vehicle 108 outside the garage 104 until the boxes 136 are removed from the garage floor.

In some examples, the monitoring server 122 can send a command to the control unit 120 to perform an action or can send a command directly to the controller 126 to perform an action. In some implementations, the monitoring server 122 uses the control unit 120 to provide commands to video cameras 110 to adjust recording settings of the video cameras 110 or to adjusting viewing angles of the video cameras 110. For example, the monitoring server 122 may command video cameras 110 to begin recording or stop recording video. In other implementations, the monitoring server 122 sends one or more commands to controller 126 to cause adjustment of the video cameras 110.

Figure 2:
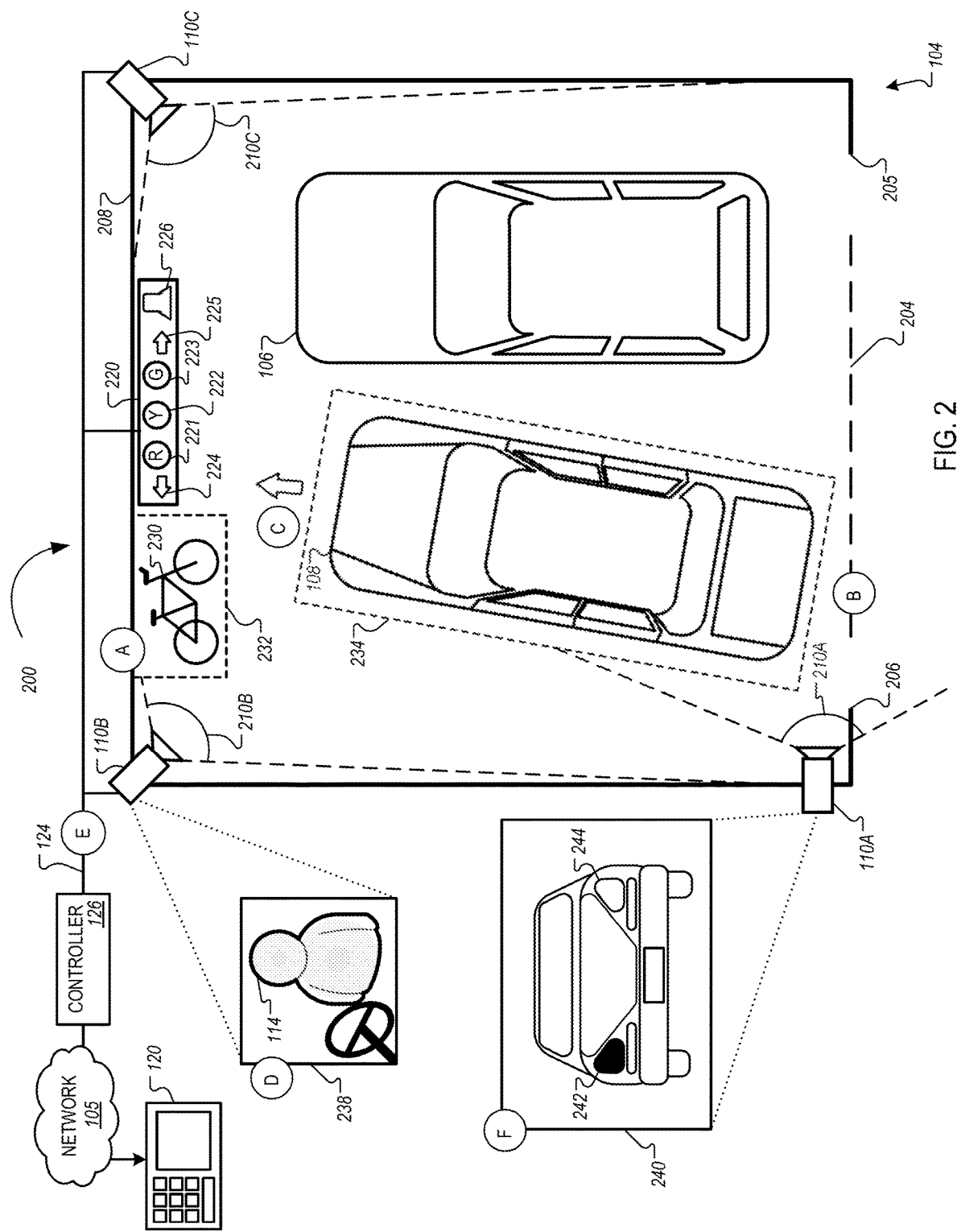
FIG. 2 shows an overhead view of an example garage with a garage monitoring system.

FIG. 2 shows an overhead view of an example garage with a garage monitoring system. For example, the garage monitoring system 200 can be a sub-system of the system 100 at the property 102. The garage 104 has a front wall 208, and a garage door opening 204 opposite from the front wall 208. The vehicles 106, 108 routinely park in the garage 104. In the example of FIG. 2, the two vehicles 106, 108 park in the garage 104 with the fronts of the vehicles 106, 108 toward the front wall 208 of the garage 104. However, the garage monitoring system 200 can be used for any number of vehicles, and any vehicle positions, in the garage 104.

The system 200 includes three video cameras 110A, 110B, 110C installed in the garage 104. The video cameras 110A, 110B, 110C are collectively referred to as the video cameras 110. Each of the video cameras 110A, 110B, 110C has a field of view 210A, 210B, 210C. The fields of view 210A, 210B, 210C are collectively referred to as the fields of view 210. The fields of view 210 define the areas that are visible to the video cameras 110. The fields of view 210 are each greater than 90 degrees. The video cameras 110 can be mounted in elevated positions in the garage 104 such that the combined fields of view 210 of the video cameras 110 include the entire interior of the garage 104. Larger sized garages may require greater numbers of video cameras 110. For example, a one-car garage may only require two video cameras. The garage 104 is a two-car garage, and includes three video cameras 110.

The video camera 110A is mounted so that the field of view 210A includes a garage door opening 204. The field of view 210A also includes an area inside of the garage door opening 204 and outside of the garage door opening 204. The video camera 110A can collect images of a vehicle, e.g., the vehicle 108, when parking in the garage 104. For example, the video camera 110A can collect images of the vehicle 108 as the vehicle 108 approaches the garage 104 from outside, crosses a threshold of the garage door opening 204, and parks in the garage 104. The video camera 110A can also collect images of the vehicle 108 departing from the garage 104. For example, the video camera 110A can collect images of the vehicle 108 as the vehicle 108 approaches the garage door opening 204 from the inside, crosses the threshold, and exits the garage 104. The video camera 110 can detect any objects that may be located behind the vehicles 106, 108 as the vehicles 106, 108 back out of the garage 104.

The video camera 110B is mounted in a front left corner of the garage 104. The field of view 210B includes the front wall 208 of the garage 104 and the left edge 206 of the garage door opening 204. Similarly, the video camera 110C is mounted in a front right corner of the garage 104 such that the field of view 210C includes the front wall 208 of the garage 104. The field of view 210C also includes the right edge 205 of the garage door opening 204.

The video cameras 110B, 110C can use computer vision technology to locate and identify the edges 205, 206 of the garage door opening 204. The garage monitoring system 200 can be programmed such that the edges 205, 206 are always visible by one of the video cameras 110. If either of the edges 205, 206 of the garage door opening 204 are occluded from the video cameras 110 by a vehicle or other object, the video cameras 110 can send an alert to the controller 126.

The garage monitoring system 200 includes a signaling device 220 coupled to the garage 104. The signaling device 220 communicates electronically with the controller 126 and the video cameras 110. The signaling device 220 can be installed such that the drivers of both of the vehicles 106, 108 can see the signaling device 220 while operating the vehicles 106, 108 in the garage 104. The signaling device 220 can include signal lights 221 to 225 for signaling to the drivers of the vehicles 106, 108. For example, the signaling device 220 can include a red light 221 that indicates to a driver that the vehicle needs to stop, e.g., if the vehicle is near a boundary such as the front wall 208. The signaling device 220 can include a yellow light 222 that indicates to a driver that the vehicle is approaching a boundary and will soon need to stop. The signaling device 220 can include a green light 223 that indicates to a driver that the vehicle can continue to move in its current direction. The signaling device 220 can include a left arrow light 224 that indicates to a driver that the vehicle is too far right and needs to steer left. The signaling device 220 can include a right arrow light 225 that indicates to a driver that the vehicle is too far left and needs to steer right.

The controller 126 can send commands to the signaling device 220 based on the status of the garage door. For example, the controller 126 can send a command to the signaling device 220 to illuminate the appropriate signal lights 221 to 225 when the garage door is open, based on receiving video data indicating that the garage door is open. The controller 126 can send a command to turn off the signal lights 221 to 225 when the garage door is closed, based on receiving video data indicating that the garage door is closed.

The signaling device 220 can include an audible alarm 226. The audible alarm 226 can produce, for example, a horn sound that is audible by a driver of a vehicle in the garage 104. The audible alarm 226 may be activated by occlusion of one or more of the edges 205, 206 of the garage door opening 204. The audible alarm 226 can also provide redundancy to the signal lights 221. For example, the vehicle 106 may start to back out of the garage 104. The vehicle 106 may turn too far to the right such that the vehicle 106 is approaching the right edge 205 of the garage door opening 204. The controller 126 can illuminate the left arrow light 224 to indicate that the driver needs to steer left. If the vehicle 106 continues to approach the edge 205, the controller 126 can activate the audible alarm 226.

The audible alarm 226 can be used to alert a driver to any urgent situation in the garage 104. For example, the audible alarm 226 can be used to signal to a driver that the vehicle is approaching within close range to another vehicle or to a person in the garage. The audible alarm 226 can also indicate to the driver that there is an anomaly in the garage 104, e.g., an animal detected in the garage 104, or an obstruction in the path of the vehicle.

The video cameras 110 can generate alerts based on alert criteria. For example, alert criteria can include generating an alert if a vehicle approaches within a configurable distance of the edges 205, 206 of the garage door opening 204, or within a configurable distance of another boundary, e.g., the front wall 208. In some examples, alert criteria can include generating an alert if the vehicle 108 parks in the garage 104 with the vehicle 108 extending past the threshold of the garage door opening 204. If a vehicle position satisfies the alert criteria, the video cameras 110 can send the alerts to the controller 126.

In response to receiving alerts from the video cameras 110, the controller 126 can send a command to activate one or more signal lights 221 to 225 of the signaling device 220, to activate the audible alarm 226, or both. The controller 126 can also send a command to one or more video cameras 110, e.g., to zoom in, zoom out, or reposition the video cameras 110. For example, the video camera 110A may detect an animal entering through the garage door opening 204. The video camera 110A can send an alert to the controller 126. The controller 126 can send a command to the video cameras 110B and/or 110C to zoom in and/or to reposition in order to locate the animal in the garage 104.

In stage (A) of FIG. 2, the garage door is initially shut and there is a bicycle 230 leaning against the front wall 208 of the garage 104. The bicycle 230 is located within the fields of view 210B and 210C of the video cameras 110B and 110C. The video cameras 110B and 110C detect the bicycle 230 using computer vision technology. The analytics software of the video cameras 110B and 110C can create a video tripwire 232 or area of interest at a configurable distance around the bicycle 230.

In stage (B) of FIG. 2, the garage door opens. The video cameras 110 collect images of the garage door as the garage door opens. The video cameras 110 use computer vision technology to determine that the garage door is open. In response to the garage door opening, the video cameras 110 identify the vehicles 106, 108 as targets. The video cameras 110 determine that the vehicle 106 is stationary in the garage 104. The video cameras 110 determine that the vehicle 108 is outside the garage 104, and is approaching the threshold of the garage door opening 204. The video cameras 110 create a bounding box 234 around the vehicle 108 and track the target location of the vehicle 108.

In stage (C) of FIG. 2, the vehicle 108 enters the garage 104. As the vehicle 108 maneuvers within the fields of view 210 of the video cameras 110, the video cameras 110 generate alerts based on the position of the vehicle 108. As the vehicle 108 crosses the threshold of the garage door opening 204, the controller 126 sends a command to the signaling device 220 to illuminate the green light 223 indicating that the driver should continue to move forward. As the front of the vehicle 108 nears the video tripwire 232, the signaling device 220 may illuminate the yellow light 222, indicating that the driver should slow the vehicle 108. When the rear of the vehicle 108 clears the threshold of the garage door opening 204, the signaling device 220 may illuminate the red light 221, indicating that the driver should stop the vehicle 108. If the vehicle 108 continues to move forward such that the bounding box 234 crosses the tripwire 232 and/or enters the area of interest, the video cameras 110B, 110C send an alert to the controller 126. The controller 126 sends a command to the signaling device 220 to activate the audible alarm 226.

In some examples, the vehicle 108 may not pull far enough into the garage 104. For example, the rear of the vehicle 108 may extend past the threshold of the garage door opening 204. The video camera 110A can determine that the vehicle 108 is extending past the threshold. The video camera 110A can send an alert to the controller 126 that the threshold is not clear. The controller 126 can send a signal to the signaling device 220 to illuminate the green light 223. The green light 223 indicates to the driver that the vehicle 108 needs to move forward. Once the vehicle 108 is clear of the threshold, the signaling device 220 can illuminate the red light 221.

In some examples, the monitoring system may perform additional actions in response to the garage door opening and the vehicle 108 entering the garage 104. For example, the video cameras 110 can perform vehicle recognition on the vehicle 108 when the garage door opens. The video cameras 110 can identify the vehicle 108 based on the size, shape, color, lighting configuration, and license plates of the vehicle 108.

In stage (D) of FIG. 2, the video cameras 110 identify the driver of the vehicle 108. For example, the video cameras 110 may collect one or more images 238 of the driver of the vehicle 108. The video cameras 110 can perform facial recognition on the driver. The video cameras 110 may also identify the driver of the vehicle 108 based on monitoring system settings. For example, if the resident 114 is assigned to the vehicle 108 in the monitoring system settings, the video cameras 110 can determine that the resident 114 is driving the vehicle 108. Additionally, a mobile device assigned to the resident 114 may automatically connect to the network 105.

In stage (E) of FIG. 2, the video cameras 110 send video data 124 to the control unit 120 indicating that the vehicle 108 is entering the garage 104. The video data 124 can also include the identity of the driver, e.g., the resident 114. The control unit 120 can configure monitoring system settings based on the preferences of the resident 114. For example, the control unit 120 can adjust the thermostat to a programmed temperature preference of the resident 114.

The control unit 120 and/or the monitoring server 122 can generate notifications to one or more users regarding the status of the vehicle 108. For example, the video cameras 110 may identify that the driver is a teenage child of the resident 114. The monitoring system may be programmed to alert the resident 114 when the teenage child departs from or arrives to the garage 104. The monitoring server 122 can generate and send a notification to the resident 114 indicating that the vehicle 108 has parked in the garage 104. The notification can include images or video clips of the vehicle 108 parking in the garage 104.

The garage monitoring system 200 can monitor the vehicle 108 for appropriate vehicle lighting as the vehicle 108 maneuvers in the garage 104. Specifically, the garage monitoring system 200 can monitor the rear lighting of the vehicle 108. Drivers typically cannot monitor the functionality of the rear lights of vehicles while driving. The garage monitoring system 200 can monitor vehicles for rear lighting problems, and notify the driver.

For example, while the resident 114 is parking the vehicle 108 in the garage 104, the video camera 110A can collect one or more images 240 of the rear of the vehicle 108. The images 240 can include the rear lighting configuration of the vehicle 108, e.g., the brake lights, taillights, and reverse lights. The analytics software of the video camera 110A can include expected vehicle light pattern information. The vehicle light pattern information can include generic vehicle light patterns and/or can include specific light patterns for the vehicles 106, 108 that routinely park in the garage 104.

The analytics software of the camera 110A can adapt and update the vehicle light pattern information over time. For example, the vehicle 108 may have an automatic lighting system based on environmental light levels. Thus, the taillights 242, 244 of the vehicle 108 may illuminate automatically when the vehicle 108 crosses the threshold of the garage door opening 204, due to low light levels in the garage. The brake lights and reverse lights may also illuminate periodically as the driver maneuvers the vehicle 108 while parking in the garage 104. Over time, the video camera 110A can collect images 240 that show the typical rear lighting patterns as the vehicle 108 parks in the garage 104.

In some examples, a user can calibrate the garage monitoring system to identify certain vehicle lighting patterns. The garage monitoring system can present, e.g., on a display of the control unit 120, a series of images 240 of the vehicle 108 that were collected by the video cameras 110 while the vehicle 108 parked in the garage 104. The user can calibrate the garage monitoring system by selecting certain images that show the brake lights illuminated, certain images that show the taillights illuminated, and certain images that show the reverse lights illuminated.

In some examples, the expected vehicle lighting pattern may depend on outdoor lighting conditions. For example, during the daytime, in clear weather, taillights are not expected to be illuminated. The video cameras 110 can receive weather data from the control unit 120. The video cameras 110 can determine if the tail lights are expected to be illuminated based on the sunrise and sunset times, and based on the weather conditions at the location of the property.

In stage (F) of FIG. 2, the video camera 110 collects an image 240 that shows the left taillight 242 extinguished while the right taillight 244 is illuminated. The vehicle light pattern information of the analytics software indicates that both taillights 242, 244 should be illuminated in the garage 104. The video camera 110A can determine that there is an anomaly in the rear lighting pattern of the vehicle 108. The video camera 110A can send an alert to the controller 126 and/or the control unit 120.

When the control unit 120 receives an alert that there is an anomaly in the rear lighting pattern of the vehicle 108, the control unit 120 can send a notification to the resident 114. For example, the control unit 120 can send a notification to the resident 112 through a text message, telephone call, or email. The notification can include the image 240 that shows the extinguished left taillight 242. The resident 114 can then take action to repair the rear light of the vehicle 108.

In some examples, the controller 126 can send a command to the signaling device 220 to provide an indication to the resident 114 that there is a lighting anomaly. For example, the signaling device 220 may include a display panel or a warning light that can indicate when the video cameras 110 detect a possible maintenance problem with the vehicle 108. In some examples, the signaling device 220 can activate the audible alarm 226 if the video cameras 110 detect a lighting anomaly. For example, if the resident 114 opens the garage door to back the vehicle 108 out of the garage 104, and the video cameras 110 detect a lighting anomaly, the signaling device 220 may activate the audible alarm 226 to indicate to the resident 114 that it is unsafe to drive the vehicle 108. The resident 114 then may also receive a notification, e.g., to a mobile device, that includes information regarding the specific anomaly that was detected.

Figure 3:
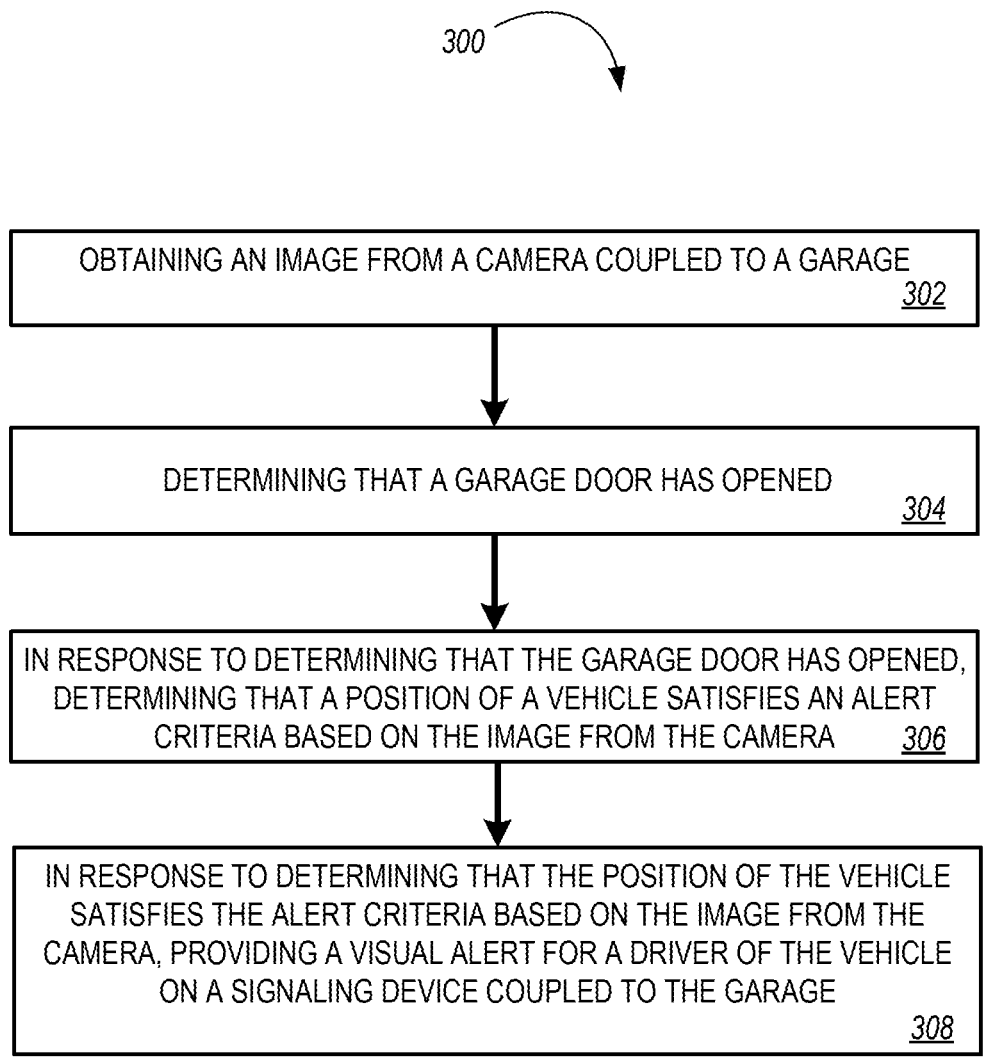
FIG. 3 is a flowchart of an example process for garage monitoring.

FIG. 3 is a flowchart of an example process 300 for notifications for camera tampering. The process 300 can be performed by one or more computer systems, for example, the video cameras 110 or the control unit 120. In some implementations, some or all operations of the process 300 can be performed by the monitoring server 122, or by another computer system located at the monitored property.

Briefly, the process 300 includes obtaining an image from a camera coupled to a garage (302). The camera can be, for example, one of the video cameras 110A, 110B, 110C. The garage can be, for example, the garage 104. The image can include images of the interior of the garage, including vehicles, objects, and people in the garage. The camera may be installed in a corner of the garage. The camera may have a field of view that includes a wall of the garage, a garage door, or both.

The process 300 includes determining that a garage door has opened (304). The monitoring system can determine that the door of the garage has opened, for example, using computer vision technology. Determining that the garage door has opened can include determining an illumination level of the image. Based on the illumination level of the image, the system can determine that the garage door is open. The system may be calibrated to various lighting conditions in the garage. The system can then compare detected illumination levels in the garage with expected illumination levels in the garage, based on the calibration, to determine that status of the garage door. For example, the system may be calibrated to an expected illumination between six hundred and nine hundred lumens when the garage door is open at night, an expected illumination between nine hundred and twelve hundred lumens when the garage door is open on a cloudy day, and an expected illumination greater than twelve hundred lumens when the garage door is open on a sunny day. The system may be calibrated to an expected illumination between five hundred and eight hundred lumens when the garage door is shut during daytime, and an expected illumination less than five hundred lumens when the garage door is shut during nighttime. The camera may determine an illumination level in the garage of six hundred fifty lumens. The system may receive weather data indicating that the time of day is daytime, and that current weather conditions are sunny. Therefore, based on the illumination level of six hundred fifty lumens on a sunny day, the system can determine that the garage door is likely shut.

In some examples, determining that the garage door has opened can include identifying, using computer vision technology, movement of the garage door. For example, the system may determine that an overhead door is moving, or has moved, in an upward direction. Based on identifying movement of the garage door, the system can determine that the garage door has opened. In some examples, determining that the garage door has opened can include determining, using computer vision technology, a size of an opening of the garage doorway. For example, the system may determine that the size of the opening, e.g., between a bottom edge of the garage door and the garage floor, has increased or is increasing. Based on determining that the size of the opening has increased or is increasing, the system can determine that the garage door has opened. In another example, determining that the garage door has opened can include determining that an object outside of the garage is visible to a camera. For example, a tree may be located outside of the garage, such that when the garage door is open, the tree is visible to a camera in the garage. The system can then determine, based on the object outside of the garage being visible to the camera, that the garage door has opened.

The process 300 includes, in response to determining that the garage door has opened, determining that a vehicle position satisfies an alert criteria based on the image from the camera (306). While the garage door is closed, the monitoring system might not track the position of the vehicle in the garage. When the garage door opens, the monitoring system determines the position of the vehicle in the garage, and tracks the position of the vehicle to determine if the position satisfies the alert criteria. The vehicle can be, for example, the vehicle 106. The vehicle may be maneuvering in the garage, e.g., backing out of the garage.

The operations can include determining, based on the image, the vehicle position. For example, the camera 110B can perform object recognition on the image, and can recognize the object of the vehicle 108. The camera 110B can identify that the vehicle is within the garage 104 or is not within the garage 104. The camera 110B can also detect a position of the vehicle when the vehicle 108 is inside the garage 104. The camera 110B can determine an orientation of the vehicle, a distance between the vehicle and the camera, and a direction of motion of the vehicle. For example, the camera 110B may determine that the vehicle 108 is backing into the garage 104, is twenty feet away from the camera, and that a side surface of the vehicle is positioned at a thirty-degree angle relative to a side wall of the garage.

The operations can include determining the vehicle position based on one or more of geofencing or GPS. For example, the system may receive GPS tracking data from the vehicle 108. Based on the GPS tracking data, the system can determine a distance of the vehicle 108 from the garage 104. The system can also determine direction of motion of the vehicle 108, e.g., whether the vehicle 108 is moving toward the garage 104 or away from the garage 104. The system can also receive geofencing data for the vehicle 108. Geofencing data can indicate whether the vehicle 108 is within a designated radius of the garage 104, or whether the vehicle 108 is within a wireless communication range of one or more devices at the garage 104. For example, the camera may determine based on GPS, geofencing, or both, that the vehicle is approaching the garage and is thirty feet from the garage door.

The operations can include generating the alert criteria. Generating the alert criteria can include storing a model of the garage. The model of the garage can include a position of at least one garage wall. The model of the garage can include a position of at least one edge of a doorway of the garage door. For example, the model of the garage 104 can include a position of the front wall 208, the right edge 205, and the left edge 206.

Generating the alert criteria can include generating a virtual line crossing in the model. The virtual line crossing can represent a vehicle position limit. The alert criteria can include the vehicle position crossing the virtual line crossing. For example, the model of the garage 104 can include a virtual line crossing, e.g., tripwire 232. The tripwire 232 represents a vehicle position limit in the direction of the front wall 208.

Generating the virtual line crossing can include determining a position of an object in the garage. The system can generate a virtual line crossing at a distance away from the object in the garage. For example, the camera 110B can use object detection to detect and identify the bicycle 230. The camera 110B can determine a position of the bicycle 230. The position of the bicycle can include an orientation and size of the bicycle 230. The system can then generate the tripwire 232 at a distance away from the bicycle 230. The tripwire may be, for example, at a distance of two feet from the bicycle 230.

The position of the object in the garage can include a range of positions of the object in the garage. For example, the camera may detect an object that has an access panel or door, such as a refrigerator with a swinging door. The refrigerator door may have a range of positions between an open position and a shut position. The system can generate the virtual line crossing at a distance away from the range of positions of the object. For example, the system can generate the virtual line crossing at a distance from the swinging radius of the refrigerator door, to detect a vehicle position that might inhibit opening the refrigerator door.

Generating the virtual line crossing can include determining a position of a second vehicle in the garage. Generating the virtual line crossing can include generating a virtual line crossing at a distance away from the second vehicle. For example, the vehicle 106 may be parked in the garage 104. The system can determine the position of the vehicle 106 in the garage 104. The system can generate a virtual line crossing at a distance away from the vehicle 106 while the vehicle 106 is parked in the garage 104. The virtual line crossing may be positioned, for example, along a side surface of the vehicle 106 at a distance of, e.g., eighteen inches. The virtual line crossing can represent a minimum allowable distance of eighteen inches between the vehicle 108 and the vehicle 106.

The virtual line crossing can represent a minimum vehicle distance to the garage wall. For example, the virtual line crossing can be positioned at a distance of three feet from a side wall of the garage 104. The virtual line crossing can represent a minimum allowable distance of three feet between the vehicle 108 and the side wall of the garage.

Determining that the vehicle position satisfies the alert criteria based on the image can include generating, based on the image, a virtual bounding box around the vehicle. In some examples, the bounding box may have a particular shape, e.g., a rectangular shape as illustrated by the bounding box 234. In some examples, the bounding box may approximate the shape of the vehicle. For example, the bounding box may be a virtual three-dimensional box with sides of the bounding box positioned a distance away from surfaces of the vehicle, e.g., six inches. Determining that the vehicle position satisfies the alert criteria can include determining that the virtual bounding box around the vehicle overlaps with the virtual line crossing. For example, the system can generate the virtual bounding box 234 around the vehicle 108. The camera can determine that the virtual bounding box 234 overlaps with the tripwire 232. Based on the virtual bounding box 234 overlapping with the tripwire 232, the system can determine that the vehicle position of vehicle 108 satisfies the alert criteria.

In some examples, the virtual line crossing can represent a minimum vehicle distance to the edge of the doorway. For example, the virtual line crossing can represent a minimum vehicle distance of three feet to the right edge 205 of the garage door opening 204. The vehicle 106 may satisfy the alert criteria by crossing the virtual line crossing and approaching within three feet of the right edge 205 of the garage.

Determining that the vehicle position satisfies alert criteria can include determining, based on the image, that an obstruction is present in the garage. For example, the camera may determine that an object such as a box, a garbage bin, or recreational equipment is present in the garage 104. The camera may determine that the object is located in a position of the garage that is typically occupied by a vehicle. For example, the camera may determine that the object is located in parking spot 107 or parking spot 109.

Determining that the vehicle position satisfies alert criteria can include determining that the vehicle position is moving toward the obstruction. For example, the system may determine based on GPS data that the vehicle 108 is approaching the garage 104. The system may determine that the garage door is opening or has opened. Based on the GPS and data and based on determining that the garage door is opening, the system can determine that the vehicle position is moving toward the obstruction. The system can determine that the vehicle position satisfies the alert criteria based on determining that the vehicle position is moving toward the obstruction. In some examples, the system may determine that the vehicle position satisfies the alert criteria based on determining that the vehicle position has approached within a programmed range of the obstruction, e.g., within twenty feet of the obstruction.

In some examples, determining that the vehicle position satisfies alert criteria can include determining that an object is underneath or in the path of a vehicle that is departing from the garage. For example, while the vehicle is stationary, the camera may detect an object rolling underneath the vehicle, or rolling to a position between the vehicle and the garage door. The camera may then identify a driver entering the garage and entering the driver's side of the vehicle. In response to detecting the object underneath the vehicle or between the vehicle and the garage door, and identifying that the driver has entered the vehicle, the system can determine that the vehicle is likely departing the garage, and that the object is within the path of the departing vehicle. The system can therefore determine that the vehicle position satisfies alert criteria. The system may then provide a notification to the driver indicating that the object is in the path of the departing vehicle. For example, the system can send a notification to a display on the vehicle dashboard, send a notification to a mobile device associated with the driver, or trigger an audible or visual alarm on a signaling device in the garage.

The process 300 includes, in response to determining that the vehicle position satisfies the alert criteria based on the image from the camera, providing a visual alert for a driver of the vehicle on a signaling device coupled to the garage (308). The visual alert can include signal lights, e.g., one or more of the signal lights 221 to 225 of the signaling device 220. The signal lights can be located in a position such that they are visible by the drivers of the vehicles in the garage. The signal lights can provide a visual alert for the driver that indicates that the driver should maneuver the vehicle in a particular manner. For example, the signal lights can provide a visual alert for the driver that indicates that the driver should slow, stop, turn left, or turn right.

The operations can include transmitting, to a user device of a user associated with the garage, a notification that the vehicle position is moving toward the obstruction. For example, the system can provide a notification to the mobile device 116, associated with the resident 112, to the mobile device 118, associated with the resident 114, or to both. The notification may state, for example, "Vehicle 108 is approaching the garage. Obstruction detected in the garage."

The operations can include transmitting, to a display within the vehicle, a notification that the vehicle position is moving toward the obstruction. For example, the system can provide a notification to the vehicle 108, e.g., for presentation on a dashboard display of the vehicle 108. The notification may state, for example, "Obstruction detected in the garage."

The operations can include providing an audible alert for a driver of the vehicle. For example, the audible alert may be provided by the vehicle 108, by a mobile device of the vehicle, or by the signaling device 220. The audible alert can include, for example, an audible horn, beep, siren, or spoken words.

The operations can include determining, based on the image, that the edge of the doorway is obstructed from view of the camera. In response to determining that the edge of the doorway is obstructed from view of the camera, the system can provide an alert to a user associated with the garage. For example, the video camera 110B is mounted in a front left corner of the garage 104. The field of view 210B includes the left edge 206 of the garage door opening 204. The video camera 110B can determine if the edge 206 of the garage door opening 204 is occluded from the video camera 110B by a vehicle or other object. A vehicle obstructing the edge 206 from view of the camera 110B can indicate that the vehicle is on a path to collide with the edge 206. In response to determining that the garage door opening 204 is occluded from the video camera 110B, the video camera 110B can determine that the vehicle position satisfies the alert criteria.

For example, the camera 110B may determine that the left edge 206 is obstructed from view by the vehicle 106. The system can provide an alert to a user associated with the garage indicating that the left edge 206 is obstructed from view. The system can provide the alert to the user, e.g., through a notification sent to the vehicle 106, to a mobile device associated with the user, or to the signaling device 220.

Figure 4:
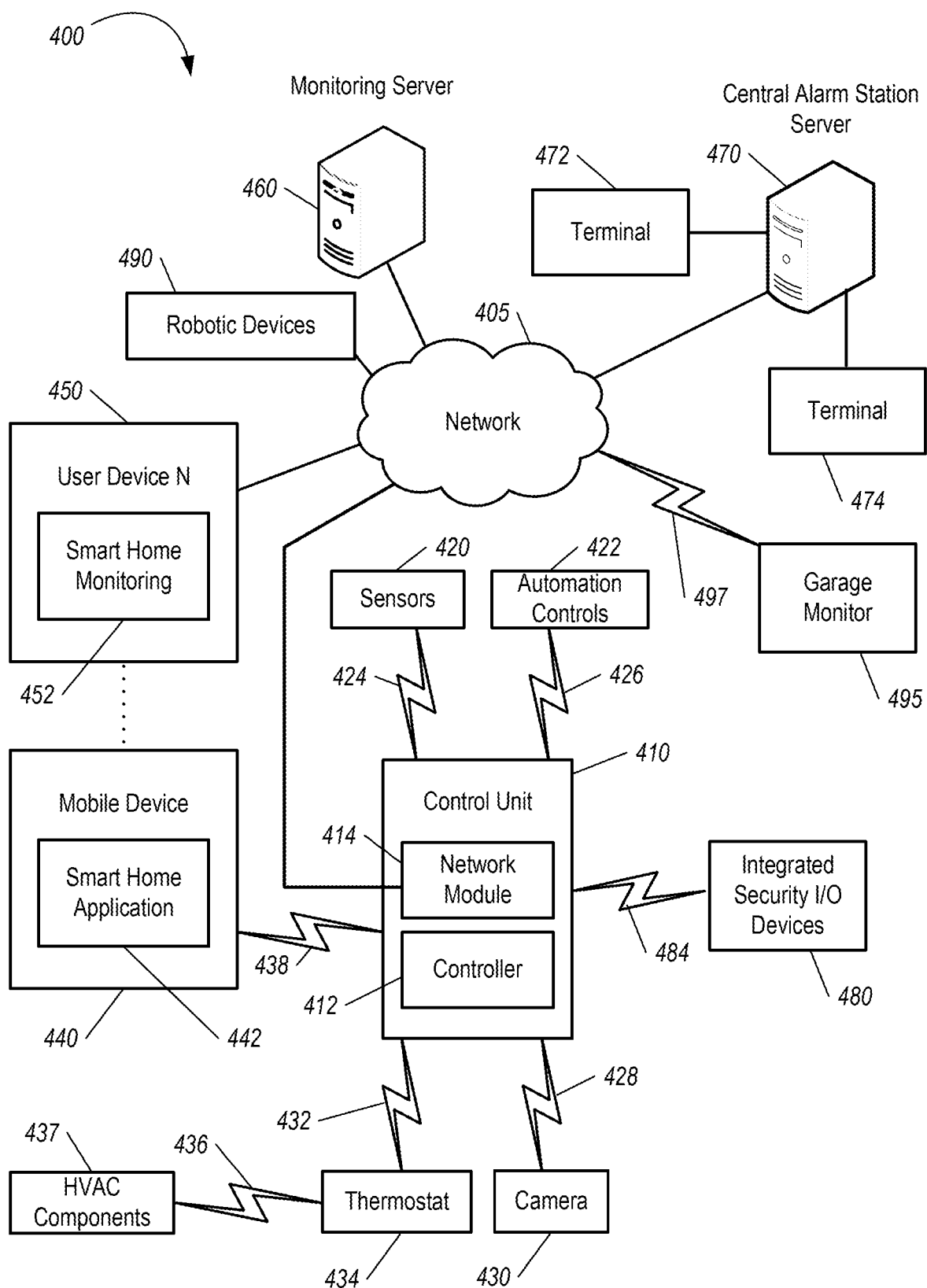
FIG. 4 shows a diagram illustrating an example property monitoring system that includes garage monitoring.

FIG. 4 is a diagram illustrating an example of a home monitoring system 400. The monitoring system 400 includes a network 405, a control unit 410, one or more user devices 440 and 450, a monitoring server 460, and a central alarm station server 470. In some examples, the network 405 facilitates communications between the control unit 410, the one or more user devices 440 and 450, the monitoring server 460, and the central alarm station server 470.

The network 405 is configured to enable exchange of electronic communications between devices connected to the network 405. For example, the network 405 may be configured to enable exchange of electronic communications between the control unit 410, the one or more user devices 440 and 450, the monitoring server 460, and the central alarm station server 470. The network 405 may include, for example, one or more of the Internet, Wide Area Networks (WANs), Local Area Networks (LANs), analog or digital wired and wireless telephone networks (e.g., a public switched telephone network (PSTN), Integrated Services Digital Network (ISDN), a cellular network, and Digital Subscriber Line (DSL)), radio, television, cable, satellite, or any other delivery or tunneling mechanism for carrying data. Network 405 may include multiple networks or subnetworks, each of which may include, for example, a wired or wireless data pathway. The network 405 may include a circuit-switched network, a packet-switched data network, or any other network able to carry electronic communications (e.g., data or voice communications). For example, the network 405 may include networks based on the Internet protocol (IP), asynchronous transfer mode (ATM), the PSTN, packet-switched networks based on IP, X.25, or Frame Relay, or other comparable technologies and may support voice using, for example, VoIP, or other comparable protocols used for voice communications. The network 405 may include one or more networks that include wireless data channels and wireless voice channels. The network 405 may be a wireless network, a broadband network, or a combination of networks including a wireless network and a broadband network.

The control unit 410 includes a controller 412 and a network module 414. The controller 412 is configured to control a control unit monitoring system (e.g., a control unit system) that includes the control unit 410. In some examples, the controller 412 may include a processor or other control circuitry configured to execute instructions of a program that controls operation of a control unit system. In these examples, the controller 412 may be configured to receive input from sensors, flow meters, or other devices included in the control unit system and control operations of devices included in the household (e.g., speakers, lights, doors, etc.). For example, the controller 412 may be configured to control operation of the network module 414 included in the control unit 410.

The network module 414 is a communication device configured to exchange communications over the network 405. The network module 414 may be a wireless communication module configured to exchange wireless communications over the network 405. For example, the network module 414 may be a wireless communication device configured to exchange communications over a wireless data channel and a wireless voice channel. In this example, the network module 414 may transmit alarm data over a wireless data channel and establish a two-way voice communication session over a wireless voice channel. The wireless communication device may include one or more of a LTE module, a GSM module, a radio modem, cellular transmission module, or any type of module configured to exchange communications in one of the following formats: LTE, GSM or GPRS, CDMA, EDGE or EGPRS, EV-DO or EVDO, UMTS, or IP.

The network module 414 also may be a wired communication module configured to exchange communications over the network 405 using a wired connection. For instance, the network module 414 may be a modem, a network interface card, or another type of network interface device. The network module 414 may be an Ethernet network card configured to enable the control unit 410 to communicate over a local area network and/or the Internet. The network module 414 also may be a voice band modem configured to enable the alarm panel to communicate over the telephone lines of Plain Old Telephone Systems (POTS).

The control unit system that includes the control unit 410 includes one or more sensors. For example, the monitoring system may include multiple sensors 420. The sensors 420 may include a lock sensor, a contact sensor, a motion sensor, or any other type of sensor included in a control unit system. The sensors 420 also may include an environmental sensor, such as a temperature sensor, a water sensor, a rain sensor, a wind sensor, a light sensor, a smoke detector, a carbon monoxide detector, an air quality sensor, etc. The sensors 420 further may include a health monitoring sensor, such as a prescription bottle sensor that monitors taking of prescriptions, a blood pressure sensor, a blood sugar sensor, a bed mat configured to sense presence of liquid (e.g., bodily fluids) on the bed mat, etc. In some examples, the health-monitoring sensor can be a wearable sensor that attaches to a user in the home. The health-monitoring sensor can collect various health data, including pulse, heart rate, respiration rate, sugar or glucose level, bodily temperature, or motion data.

The sensors 420 can also include a radio-frequency identification (RFID) sensor that identifies a particular article that includes a pre-assigned RFID tag.

The control unit 410 communicates with the home automation controls 422 and a camera 430 to perform monitoring. The home automation controls 422 are connected to one or more devices that enable automation of actions in the home. For instance, the home automation controls 422 may be connected to one or more lighting systems and may be configured to control operation of the one or more lighting systems. In addition, the home automation controls 422 may be connected to one or more electronic locks at the home and may be configured to control operation of the one or more electronic locks (e.g., control Z-Wave locks using wireless communications in the Z-Wave protocol). Further, the home automation controls 422 may be connected to one or more appliances at the home and may be configured to control operation of the one or more appliances. The home automation controls 422 may include multiple modules that are each specific to the type of device being controlled in an automated manner. The home automation controls 422 may control the one or more devices based on commands received from the control unit 410. For instance, the home automation controls 422 may cause a lighting system to illuminate an area to provide a better image of the area when captured by a camera 430.

The camera 430 may be a video/photographic camera or other type of optical sensing device configured to capture images. For instance, the camera 430 may be configured to capture images of an area within a building or home monitored by the control unit 410. The camera 430 may be configured to capture single, static images of the area and also video images of the area in which multiple images of the area are captured at a relatively high frequency (e.g., thirty images per second). The camera 430 may be controlled based on commands received from the control unit 410.

The camera 430 may be triggered by several different types of techniques. For instance, a Passive Infra-Red (PIR) motion sensor may be built into the camera 430 and used to trigger the camera 430 to capture one or more images when motion is detected. The camera 430 also may include a microwave motion sensor built into the camera and used to trigger the camera 430 to capture one or more images when motion is detected. The camera 430 may have a "normally open" or "normally closed" digital input that can trigger capture of one or more images when external sensors (e.g., the sensors 420, PIR, door/window, etc.) detect motion or other events. In some implementations, the camera 430 receives a command to capture an image when external devices detect motion or another potential alarm event. The camera 430 may receive the command from the controller 412 or directly from one of the sensors 420.

In some examples, the camera 430 triggers integrated or external illuminators (e.g., Infra-Red, Z-wave controlled "white" lights, lights controlled by the home automation controls 422, etc.) to improve image quality when the scene is dark. An integrated or separate light sensor may be used to determine if illumination is desired and may result in increased image quality.

The camera 430 may be programmed with any combination of time/day schedules, system "arming state", or other variables to determine whether images should be captured or not when triggers occur. The camera 430 may enter a low-power mode when not capturing images. In this case, the camera 430 may wake periodically to check for inbound messages from the controller 412. The camera 430 may be powered by internal, replaceable batteries if located remotely from the control unit 410. The camera 430 may employ a small solar cell to recharge the battery when light is available. Alternatively, the camera 430 may be powered by the controller's 412 power supply if the camera 430 is co-located with the controller 412.

In some implementations, the camera 430 communicates directly with the monitoring server 460 over the Internet. In these implementations, image data captured by the camera 430 does not pass through the control unit 410 and the camera 430 receives commands related to operation from the monitoring server 460.

The system 400 also includes thermostat 434 to perform dynamic environmental control at the home. The thermostat 434 is configured to monitor temperature and/or energy consumption of an HVAC system associated with the thermostat 434, and is further configured to provide control of environmental (e.g., temperature) settings. In some implementations, the thermostat 434 can additionally or alternatively receive data relating to activity at a home and/or environmental data at a home, e.g., at various locations indoors and outdoors at the home. The thermostat 434 can directly measure energy consumption of the HVAC system associated with the thermostat, or can estimate energy consumption of the HVAC system associated with the thermostat 434, for example, based on detected usage of one or more components of the HVAC system associated with the thermostat 434. The thermostat 434 can communicate temperature and/or energy monitoring information to or from the control unit 410 and can control the environmental (e.g., temperature) settings based on commands received from the control unit 410.

In some implementations, the thermostat 434 is a dynamically programmable thermostat and can be integrated with the control unit 410. For example, the dynamically programmable thermostat 434 can include the control unit 410, e.g., as an internal component to the dynamically programmable thermostat 434. In addition, the control unit 410 can be a gateway device that communicates with the dynamically programmable thermostat 434. In some implementations, the thermostat 434 is controlled via one or more home automation controls 422.

A module 437 is connected to one or more components of an HVAC system associated with a home, and is configured to control operation of the one or more components of the HVAC system. In some implementations, the module 437 is also configured to monitor energy consumption of the HVAC system components, for example, by directly measuring the energy consumption of the HVAC system components or by estimating the energy usage of the one or more HVAC system components based on detecting usage of components of the HVAC system. The module 437 can communicate energy monitoring information and the state of the HVAC system components to the thermostat 434 and can control the one or more components of the HVAC system based on commands received from the thermostat 434.

In some examples, the system 400 further includes one or more robotic devices 490. The robotic devices 490 may be any type of robots that are capable of moving and taking actions that assist in home monitoring. For example, the robotic devices 490 may include drones that are capable of moving throughout a home based on automated control technology and/or user input control provided by a user. In this example, the drones may be able to fly, roll, walk, or otherwise move about the home. The drones may include helicopter type devices (e.g., quad copters), rolling helicopter type devices (e.g., roller copter devices that can fly and roll along the ground, walls, or ceiling) and land vehicle type devices (e.g., automated cars that drive around a home). In some cases, the robotic devices 490 may be devices that are intended for other purposes and merely associated with the system 400 for use in appropriate circumstances. For instance, a robotic vacuum cleaner device may be associated with the monitoring system 400 as one of the robotic devices 490 and may be controlled to take action responsive to monitoring system events.

In some examples, the robotic devices 490 automatically navigate within a home. In these examples, the robotic devices 490 include sensors and control processors that guide movement of the robotic devices 490 within the home. For instance, the robotic devices 490 may navigate within the home using one or more cameras, one or more proximity sensors, one or more gyroscopes, one or more accelerometers, one or more magnetometers, a global positioning system (GPS) unit, an altimeter, one or more sonar or laser sensors, and/or any other types of sensors that aid in navigation about a space. The robotic devices 490 may include control processors that process output from the various sensors and control the robotic devices 490 to move along a path that reaches the desired destination and avoids obstacles. In this regard, the control processors detect walls or other obstacles in the home and guide movement of the robotic devices 490 in a manner that avoids the walls and other obstacles.

In addition, the robotic devices 490 may store data that describes attributes of the home. For instance, the robotic devices 490 may store a floorplan and/or a three-dimensional model of the home that enables the robotic devices 490 to navigate the home. During initial configuration, the robotic devices 490 may receive the data describing attributes of the home, determine a frame of reference to the data (e.g., a home or reference location in the home), and navigate the home based on the frame of reference and the data describing attributes of the home. Further, initial configuration of the robotic devices 490 also may include learning of one or more navigation patterns in which a user provides input to control the robotic devices 490 to perform a specific navigation action (e.g., fly to an upstairs bedroom and spin around while capturing video and then return to a home charging base). In this regard, the robotic devices 490 may learn and store the navigation patterns such that the robotic devices 490 may automatically repeat the specific navigation actions upon a later request.

In some examples, the robotic devices 490 may include data capture and recording devices. In these examples, the robotic devices 490 may include one or more cameras, one or more motion sensors, one or more microphones, one or more biometric data collection tools, one or more temperature sensors, one or more humidity sensors, one or more air flow sensors, and/or any other types of sensors that may be useful in capturing monitoring data related to the home and users in the home. The one or more biometric data collection tools may be configured to collect biometric samples of a person in the home with or without contact of the person. For instance, the biometric data collection tools may include a fingerprint scanner, a hair sample collection tool, a skin cell collection tool, and/or any other tool that allows the robotic devices 490 to take and store a biometric sample that can be used to identify the person (e.g., a biometric sample with DNA that can be used for DNA testing).

In some implementations, the robotic devices 490 may include output devices. In these implementations, the robotic devices 490 may include one or more displays, one or more speakers, and/or any type of output devices that allow the robotic devices 490 to communicate information to a nearby user.

The robotic devices 490 also may include a communication module that enables the robotic devices 490 to communicate with the control unit 410, each other, and/or other devices. The communication module may be a wireless communication module that allows the robotic devices 490 to communicate wirelessly. For instance, the communication module may be a Wi-Fi module that enables the robotic devices 490 to communicate over a local wireless network at the home. The communication module further may be a 900 MHz wireless communication module that enables the robotic devices 490 to communicate directly with the control unit 410. Other types of short-range wireless communication protocols, such as Bluetooth, Bluetooth LE, Z-wave, Zigbee, etc., may be used to allow the robotic devices 490 to communicate with other devices in the home. In some implementations, the robotic devices 490 may communicate with each other or with other devices of the system 400 through the network 405.

The robotic devices 490 further may include processor and storage capabilities. The robotic devices 490 may include any suitable processing devices that enable the robotic devices 490 to operate applications and perform the actions described throughout this disclosure. In addition, the robotic devices 490 may include solid-state electronic storage that enables the robotic devices 490 to store applications, configuration data, collected sensor data, and/or any other type of information available to the robotic devices 490.

The robotic devices 490 are associated with one or more charging stations. The charging stations may be located at predefined home base or reference locations in the home. The robotic devices 490 may be configured to navigate to the charging stations after completion of tasks needed to be performed for the monitoring system 400. For instance, after completion of a monitoring operation or upon instruction by the control unit 410, the robotic devices 490 may be configured to automatically fly to and land on one of the charging stations. In this regard, the robotic devices 490 may automatically maintain a fully charged battery in a state in which the robotic devices 490 are ready for use by the monitoring system 400.

The charging stations may be contact based charging stations and/or wireless charging stations. For contact based charging stations, the robotic devices 490 may have readily accessible points of contact that the robotic devices 490 are capable of positioning and mating with a corresponding contact on the charging station. For instance, a helicopter type robotic device may have an electronic contact on a portion of its landing gear that rests on and mates with an electronic pad of a charging station when the helicopter type robotic device lands on the charging station. The electronic contact on the robotic device may include a cover that opens to expose the electronic contact when the robotic device is charging and closes to cover and insulate the electronic contact when the robotic device is in operation.

For wireless charging stations, the robotic devices 490 may charge through a wireless exchange of power. In these cases, the robotic devices 490 need only locate themselves closely enough to the wireless charging stations for the wireless exchange of power to occur. In this regard, the positioning needed to land at a predefined home base or reference location in the home may be less precise than with a contact based charging station. Based on the robotic devices 490 landing at a wireless charging station, the wireless charging station outputs a wireless signal that the robotic devices 490 receive and convert to a power signal that charges a battery maintained on the robotic devices 490.

In some implementations, each of the robotic devices 490 has a corresponding and assigned charging station such that the number of robotic devices 490 equals the number of charging stations. In these implementations, the robotic devices 490 always navigate to the specific charging station assigned to that robotic device. For instance, a first robotic device may always use a first charging station and a second robotic device may always use a second charging station.

In some examples, the robotic devices 490 may share charging stations. For instance, the robotic devices 490 may use one or more community charging stations that are capable of charging multiple robotic devices 490. The community charging station may be configured to charge multiple robotic devices 490 in parallel. The community charging station may be configured to charge multiple robotic devices 490 in serial such that the multiple robotic devices 490 take turns charging and, when fully charged, return to a predefined home base or reference location in the home that is not associated with a charger. The number of community charging stations may be less than the number of robotic devices 490.

In addition, the charging stations may not be assigned to specific robotic devices 490 and may be capable of charging any of the robotic devices 490. In this regard, the robotic devices 490 may use any suitable, unoccupied charging station when not in use. For instance, when one of the robotic devices 490 has completed an operation or is in need of battery charge, the control unit 410 references a stored table of the occupancy status of each charging station and instructs the robotic device to navigate to the nearest charging station that is unoccupied.

The system 400 further includes one or more integrated security devices 480. The one or more integrated security devices may include any type of device used to provide alerts based on received sensor data. For instance, the one or more control units 410 may provide one or more alerts to the one or more integrated security input/output devices 480. Additionally, the one or more control units 410 may receive one or more sensor data from the sensors 420 and determine whether to provide an alert to the one or more integrated security input/output devices 480.

The sensors 420, the home automation controls 422, the camera 430, the thermostat 434, and the integrated security devices 480 may communicate with the controller 412 over communication links 424, 426, 428, 432, 438, and 484. The communication links 424, 426, 428, 432, 438, and 484 may be a wired or wireless data pathway configured to transmit signals from the sensors 420, the home automation controls 422, the camera 430, the thermostat 434, and the integrated security devices 480 to the controller 412. The sensors 420, the home automation controls 422, the camera 430, the thermostat 434, and the integrated security devices 480 may continuously transmit sensed values to the controller 412, periodically transmit sensed values to the controller 412, or transmit sensed values to the controller 412 in response to a change in a sensed value.

The communication links 424, 426, 428, 432, 438, and 484 may include a local network. The sensors 420, the home automation controls 422, the camera 430, the thermostat 434, and the integrated security devices 480, and the controller 412 may exchange data and commands over the local network. The local network may include 802.11 "Wi-Fi" wireless Ethernet (e.g., using low-power Wi-Fi chipsets), Z-Wave, Zigbee, Bluetooth, "Homeplug" or other "Powerline" networks that operate over AC wiring, and a Category 5 (CAT5) or Category 6 (CAT6) wired Ethernet network. The local network may be a mesh network constructed based on the devices connected to the mesh network.

The monitoring server 460 is an electronic device configured to provide monitoring services by exchanging electronic communications with the control unit 410, the one or more user devices 440 and 450, and the central alarm station server 470 over the network 405. For example, the monitoring server 460 may be configured to monitor events generated by the control unit 410. In this example, the monitoring server 460 may exchange electronic communications with the network module 414 included in the control unit 410 to receive information regarding events detected by the control unit 410. The monitoring server 460 also may receive information regarding events from the one or more user devices 440 and 450.

In some examples, the monitoring server 460 may route alert data received from the network module 414 or the one or more user devices 440 and 450 to the central alarm station server 470. For example, the monitoring server 460 may transmit the alert data to the central alarm station server 470 over the network 405.

The monitoring server 460 may store sensor and image data received from the monitoring system and perform analysis of sensor and image data received from the monitoring system. Based on the analysis, the monitoring server 460 may communicate with and control aspects of the control unit 410 or the one or more user devices 440 and 450.

The monitoring server 460 may provide various monitoring services to the system 400. For example, the monitoring server 460 may analyze the sensor, image, and other data to determine an activity pattern of a resident of the home monitored by the system 400. In some implementations, the monitoring server 460 may analyze the data for alarm conditions or may determine and perform actions at the home by issuing commands to one or more of the controls 422, possibly through the control unit 410.

The monitoring server 460 can be configured to provide information (e.g., activity patterns) related to one or more residents of the home monitored by the system 400 (e.g., the residents 112, 114). For example, one or more of the sensors 420, the home automation controls 422, the camera 430, the thermostat 434, and the integrated security devices 480 can collect data related to a resident including location information (e.g., if the resident is home or is not home) and provide location information to the thermostat 434.

The central alarm station server 470 is an electronic device configured to provide alarm monitoring service by exchanging communications with the control unit 410, the one or more user devices 440 and 450, and the monitoring server 460 over the network 405. For example, the central alarm station server 470 may be configured to monitor alerting events generated by the control unit 410. In this example, the central alarm station server 470 may exchange communications with the network module 414 included in the control unit 410 to receive information regarding alerting events detected by the control unit 410. The central alarm station server 470 also may receive information regarding alerting events from the one or more user devices 440 and 450 and/or the monitoring server 460.

The central alarm station server 470 is connected to multiple terminals 472 and 474. The terminals 472 and 474 may be used by operators to process alerting events. For example, the central alarm station server 470 may route alerting data to the terminals 472 and 474 to enable an operator to process the alerting data. The terminals 472 and 474 may include general-purpose computers (e.g., desktop personal computers, workstations, or laptop computers) that are configured to receive alerting data from a server in the central alarm station server 470 and render a display of information based on the alerting data. For instance, the controller 412 may control the network module 414 to transmit, to the central alarm station server 470, alerting data indicating that a sensor 420 detected motion from a motion sensor via the sensors 420. The central alarm station server 470 may receive the alerting data and route the alerting data to the terminal 472 for processing by an operator associated with the terminal 472. The terminal 472 may render a display to the operator that includes information associated with the alerting event (e.g., the lock sensor data, the motion sensor data, the contact sensor data, etc.) and the operator may handle the alerting event based on the displayed information.

In some implementations, the terminals 472 and 474 may be mobile devices or devices designed for a specific function. Although FIG. 4 illustrates two terminals for brevity, actual implementations may include more (and, perhaps, many more) terminals.

The one or more authorized user devices 440 and 450 are devices that host and display user interfaces. For instance, the user device 440 is a mobile device that hosts or runs one or more native applications (e.g., the home monitoring application 442). The user device 440 may be a cellular phone or a non-cellular locally networked device with a display. The user device 440 may include a cell phone, a smart phone, a tablet PC, a personal digital assistant ("PDA"), or any other portable device configured to communicate over a network and display information. For example, implementations may also include Blackberry-type devices (e.g., as provided by Research in Motion), electronic organizers, iPhone-type devices (e.g., as provided by Apple), iPod devices (e.g., as provided by Apple) or other portable music players, other communication devices, and handheld or portable electronic devices for gaming, communications, and/or data organization. The user device 440 may perform functions unrelated to the monitoring system, such as placing personal telephone calls, playing music, playing video, displaying pictures, browsing the Internet, maintaining an electronic calendar, etc.

The user device 440 includes a home monitoring application 452. The home monitoring application 442 refers to a software/firmware program running on the corresponding mobile device that enables the user interface and features described throughout. The user device 440 may load or install the home monitoring application 442 based on data received over a network or data received from local media. The home monitoring application 442 runs on mobile devices platforms, such as iPhone, iPod touch, Blackberry, Google Android, Windows Mobile, etc. The home monitoring application 442 enables the user device 440 to receive and process image and sensor data from the monitoring system.

The user device 440 may be a general-purpose computer (e.g., a desktop personal computer, a workstation, or a laptop computer) that is configured to communicate with the monitoring server 460 and/or the control unit 410 over the network 405. The user device 440 may be configured to display a smart home user interface 452 that is generated by the user device 440 or generated by the monitoring server 460. For example, the user device 440 may be configured to display a user interface (e.g., a web page) provided by the monitoring server 460 that enables a user to perceive images captured by the camera 430 and/or reports related to the monitoring system. Although FIG. 4 illustrates two user devices for brevity, actual implementations may include more (and, perhaps, many more) or fewer user devices.

In some implementations, the one or more user devices 440 and 450 communicate with and receive monitoring system data from the control unit 410 using the communication link 438. For instance, the one or more user devices 440 and 450 may communicate with the control unit 410 using various local wireless protocols such as Wi-Fi, Bluetooth, Z-wave, Zigbee, HomePlug (ethernet over power line), or wired protocols such as Ethernet and USB, to connect the one or more user devices 440 and 450 to local security and automation equipment. The one or more user devices 440 and 450 may connect locally to the monitoring system and its sensors and other devices. The local connection may improve the speed of status and control communications because communicating through the network 405 with a remote server (e.g., the monitoring server 460) may be significantly slower.

Although the one or more user devices 440 and 450 are shown as communicating with the control unit 410, the one or more user devices 440 and 450 may communicate directly with the sensors and other devices controlled by the control unit 410. In some implementations, the one or more user devices 440 and 450 replace the control unit 410 and perform the functions of the control unit 410 for local monitoring and long range/offsite communication.

In other implementations, the one or more user devices 440 and 450 receive monitoring system data captured by the control unit 410 through the network 405. The one or more user devices 440, 450 may receive the data from the control unit 410 through the network 405 or the monitoring server 460 may relay data received from the control unit 410 to the one or more user devices 440 and 450 through the network 405. In this regard, the monitoring server 460 may facilitate communication between the one or more user devices 440 and 450 and the monitoring system.

In some implementations, the one or more user devices 440 and 450 may be configured to switch whether the one or more user devices 440 and 450 communicate with the control unit 410 directly (e.g., through link 438) or through the monitoring server 460 (e.g., through network 405) based on a location of the one or more user devices 440 and 450. For instance, when the one or more user devices 440 and 450 are located close to the control unit 410 and in range to communicate directly with the control unit 410, the one or more user devices 440 and 450 use direct communication. When the one or more user devices 440 and 450 are located far from the control unit 410 and not in range to communicate directly with the control unit 410, the one or more user devices 440 and 450 use communication through the monitoring server 460.

Although the one or more user devices 440 and 450 are shown as being connected to the network 405, in some implementations, the one or more user devices 440 and 450 are not connected to the network 405. In these implementations, the one or more user devices 440 and 450 communicate directly with one or more of the monitoring system components and no network (e.g., Internet) connection or reliance on remote servers is needed.

In some implementations, the one or more user devices 440 and 450 are used in conjunction with only local sensors and/or local devices in a house. In these implementations, the system 400 includes the one or more user devices 440 and 450, the sensors 420, the home automation controls 422, the camera 430, and the robotic devices 490. The one or more user devices 440 and 450 receive data directly from the sensors 420, the home automation controls 422, the camera 430, and the robotic devices 490, and sends data directly to the sensors 420, the home automation controls 422, the camera 430, and the robotic devices 490. The one or more user devices 440, 450 provide the appropriate interfaces/processing to provide visual surveillance and reporting.

In other implementations, the system 400 further includes network 405 and the sensors 420, the home automation controls 422, the camera 430, the thermostat 434, and the robotic devices 490, and are configured to communicate sensor and image data to the one or more user devices 440 and 450 over network 405 (e.g., the Internet, cellular network, etc.). In yet another implementation, the sensors 420, the home automation controls 422, the camera 430, the thermostat 434, and the robotic devices 490 (or a component, such as a bridge/router) are intelligent enough to change the communication pathway from a direct local pathway when the one or more user devices 440 and 450 are in close physical proximity to the sensors 420, the home automation controls 422, the camera 430, the thermostat 434, and the robotic devices 490 to a pathway over network 405 when the one or more user devices 440 and 450 are farther from the sensors 420, the home automation controls 422, the camera 430, the thermostat 434, and the robotic devices 490.

In some examples, the system leverages GPS information from the one or more user devices 440 and 450 to determine whether the one or more user devices 440 and 450 are close enough to the sensors 420, the home automation controls 422, the camera 430, the thermostat 434, and the robotic devices 490 to use the direct local pathway or whether the one or more user devices 440 and 450 are far enough from the sensors 420, the home automation controls 422, the camera 430, the thermostat 434, and the robotic devices 490 that the pathway over network 405 is required.

In other examples, the system leverages status communications (e.g., pinging) between the one or more user devices 440 and 450 and the sensors 420, the home automation controls 422, the camera 430, the thermostat 434, and the robotic devices 490 to determine whether communication using the direct local pathway is possible. If communication using the direct local pathway is possible, the one or more user devices 440 and 450 communicate with the sensors 420, the home automation controls 422, the camera 430, the thermostat 434, and the robotic devices 490 using the direct local pathway. If communication using the direct local pathway is not possible, the one or more user devices 440 and 450 communicate with the sensors 420, the home automation controls 422, the camera 430, the thermostat 434, and the robotic devices 490 using the pathway over network 405.

In some implementations, the system 400 provides end users with access to images captured by the camera 430 to aid in decision making. The system 400 may transmit the images captured by the camera 430 over a wireless WAN network to the user devices 440 and 450. Because transmission over a wireless WAN network may be relatively expensive, the system 400 can use several techniques to reduce costs while providing access to significant levels of useful visual information (e.g., compressing data, down-sampling data, sending data only over inexpensive LAN connections, or other techniques).

In some implementations, a state of the monitoring system and other events sensed by the monitoring system may be used to enable/disable video/image recording devices (e.g., the camera 430). In these implementations, the camera 430 may be set to capture images on a periodic basis when the alarm system is armed in an "away" state, but set not to capture images when the alarm system is armed in a "home" state or disarmed. In addition, the camera 430 may be triggered to begin capturing images when the alarm system detects an event, such as an alarm event, a door-opening event for a door that leads to an area within a field of view of the camera 430, or motion in the area within the field of view of the camera 430. In other implementations, the camera 430 may capture images continuously, but the captured images may be stored or transmitted over a network when needed.

The system 400 further includes a garage monitor 495 in communication with the control unit 410 through a communication link 497, which similarly to as described above in regards to communication links 424, 426, 428, 432, 438, and 484, may be wired or wireless and include a local network. The garage monitor 495 may be the controller 126, the control unit 410 may be the control unit 120, the sensors 420 may include the video cameras 110, the automation controls 422 may include the signaling device 220, and the monitoring server 460 may be the monitoring server 122.

The described systems, methods, and techniques may be implemented in digital electronic circuitry, computer hardware, firmware, software, or in combinations of these elements. Apparatus implementing these techniques may include appropriate input and output devices, a computer processor, and a computer program product tangibly embodied in a machine-readable storage device for execution by a programmable processor. A process implementing these techniques may be performed by a programmable processor executing a program of instructions to perform desired functions by operating on input data and generating appropriate output. The techniques may be implemented in one or more computer programs that are executable on a programmable system including at least one programmable processor coupled to receive data and instructions from, and to transmit data and instructions to, a data storage system, at least one input device, and at least one output device.

Each computer program may be implemented in a high-level procedural or object-oriented programming language, or in assembly or machine language if desired; and in any case, the language may be a compiled or interpreted language. Suitable processors include, by way of example, both general and special purpose microprocessors. Generally, a processor will receive instructions and data from a read-only memory and/or a random access memory. Storage devices suitable for tangibly embodying computer program instructions and data include all forms of non-volatile memory, including by way of example semiconductor memory devices, such as Erasable Programmable Read-Only Memory (EPROM), Electrically Erasable Programmable Read-Only Memory (EEPROM), and flash memory devices; magnetic disks such as internal hard disks and removable disks; magneto-optical disks; and Compact Disc Read-Only Memory (CD-ROM). Any of the foregoing may be supplemented by, or incorporated in, specially designed ASICs (application-specific integrated circuits).

It will be understood that various modifications may be made. For example, other useful implementations could be achieved if steps of the disclosed techniques were performed in a different order and/or if components in the disclosed systems were combined in a different manner and/or replaced or supplemented by other components. Accordingly, other implementations are within the scope of the disclosure.

What is claimed is:

1. A system comprising one or more processors and one or more computer storage media storing instructions that are operable, when executed by the one or more processors, to cause the one or more processors to perform operations comprising:
    obtaining, by the one or more processors, an image captured by a camera installed in a garage, a field of view of the camera including an edge of a doorway of a garage door;
    obtaining, by the one or more processors, data indicating a current time of day;
    determining, by the one or more processors and for a condition of the garage door being open, an expected illumination level of the image based on the current time of day;
    determining, by the one or more processors, an illumination level of the image;
    based on comparing the illumination level of the image to the expected illumination level of the image, determining, by the one or more processors, that the garage door has opened;
    in response to determining that the garage door has opened, determining, by the one or more processors, that a vehicle position relative to the edge of the doorway satisfies alert criteria based on the image captured by the camera; and
    in response to determining that the vehicle position satisfies the alert criteria based on the image captured by the camera, providing, by the one or more processors and to a signaling device installed in the garage, an instruction that causes the signaling device to display a visual alert for a driver of the vehicle, the visual alert indicating a direction in which to steer the vehicle.

2. The system of claim 1, the operations comprising generating the alert criteria, the generating comprising:
    storing a model of the garage; and
    generating a virtual line crossing in the model, the virtual line crossing representing a vehicle position limit, wherein the alert criteria comprises the vehicle position crossing the virtual line crossing.

3. The system of claim 2, wherein the vehicle comprises a first vehicle, and wherein generating the virtual line crossing comprises:
    determining a position of a second vehicle in the garage; and generating a virtual line crossing at a distance away from the second vehicle.

4. The system of claim 2, wherein determining that the vehicle position satisfies the alert criteria based on the image comprises:
generating, based on the image, a virtual bounding box around the vehicle; and
determining that the virtual bounding box around the vehicle overlaps with the virtual line crossing.

5. The system of claim 2, wherein:
the model of the garage comprises a position of the edge of the doorway of the garage door; and
the virtual line crossing represents a minimum vehicle distance to the edge of the doorway.

6. The system of claim 5, the operations comprising:
determining, based on the image captured by the camera, that the edge of the doorway is obstructed from view of the camera; and
determining that the vehicle position satisfies the alert criteria based on determining that the edge of the doorway is obstructed from view of the camera.

7. The system of claim 5, the operations comprising transmitting, to a user device of a user associated with the garage, a notification that the vehicle position is within the minimum vehicle distance to the edge of the doorway.

8. The system of claim 5, the operations comprising transmitting, to a display within the vehicle, a notification that the vehicle position is within the minimum vehicle distance to the edge of the doorway.

9. The system of claim 1, the operations comprising determining the vehicle position based on the image captured by the camera.

10. The system of claim 1, the operations comprising determining the vehicle position based on one or more of geofencing or GPS.

11. The system of claim 1, wherein the instruction that causes the signaling device to display the visual alert for the driver of the vehicle comprises a first instruction, the operations comprising:
providing, by the one or more processors and to the signaling device installed in the garage, a second instruction that causes the signaling device to produce an audible alert for the driver of the vehicle.

12. A method, comprising:
obtaining an image captured by a camera installed in a garage, a field of view of the camera including an edge of a doorway of a garage door;
obtaining data indicating a current time of day;
determining, for a condition of the garage door being open, an expected illumination level of the image based on the current time of day;
determining an illumination level of the image;
based on comparing the illumination level of the image to the expected illumination level of the image, determining that the garage door has opened;
in response to determining that the garage door has opened, determining that a vehicle position relative to the edge of the doorway satisfies alert criteria based on the image captured by the camera; and
in response to determining that the vehicle position satisfies the alert criteria based on the image captured by the camera, providing to a signaling device installed in the garage, an instruction that causes the signaling device to display a visual alert for a driver of the vehicle, the visual alert indicating a direction in which to steer the vehicle.

13. The method of claim 12, comprising generating the alert criteria, the generating comprising:
storing a model of the garage; and
generating a virtual line crossing in the model, the virtual line crossing representing a vehicle position limit, wherein the alert criteria comprises the vehicle position crossing the virtual line crossing.

14. The method of claim 13, wherein the model of the garage comprises a position of the edge of the doorway of the garage door; and
the virtual line crossing represents a minimum vehicle distance to the position of the edge of the doorway.

15. A non-transitory computer-readable medium storing software comprising instructions executable by one or more computers which, upon such execution, cause the one or more computers to perform operations comprising:
obtaining, by the one or more computers, an image captured by a camera installed in a garage, a field of view of the camera including an edge of a doorway of a garage door;
obtaining, by the one or more computers, data indicating a current time of day;
determining, by the one or more computers and for a condition of the garage door being open, an expected illumination level of the image based on the current time of day;
determining, by the one or more computers, an illumination level of the image;
based on comparing the illumination level of the image to the expected illumination level of the image, determining, by the one or more computers, that the garage door has opened;
in response to determining that the garage door has opened, determining, by the one or more computers, that a vehicle position relative to the edge of the doorway satisfies alert criteria based on the image captured by the camera; and
in response to determining that the vehicle position satisfies the alert criteria based on the image captured by the camera, providing, by the one or more computers and to a signaling device installed in the garage, an instruction that causes the signaling device to display a visual alert for a driver of the vehicle, the visual alert indicating a direction in which to steer the vehicle.

16. The system of claim 1, wherein the camera is installed at a front wall of the garage, the front wall being opposite from the garage door.

17. The system of claim 1, the operations comprising:
generating, by the one or more processors, a virtual bounding box around the vehicle; and
generating, by the one or more processors, a virtual line crossing at a configurable distance from the edge of the doorway,
wherein determining, by the one or more processors, that the vehicle position relative to the edge of the doorway satisfies alert criteria comprises determining, based on the image captured by the camera, that an edge of the virtual bounding box around the vehicle crosses the virtual line crossing.

18. The system of claim 1, the operations comprising:
obtaining, by the one or more processors, a plurality of video frames captured by the camera; and
determining, by the one or more processors and based on the plurality of video frames, that the vehicle is in motion,
wherein determining that the vehicle position relative to the edge of the doorway satisfies the alert criteria comprises determining that (i) the vehicle is in motion and (ii) the vehicle position is within a minimum vehicle distance to the edge of the doorway.

19. The system of claim 11, wherein the image captured by the camera comprises a first image captured by the camera at a first time, and the alert criteria comprises first alert criteria, the operations comprising:
  obtaining, by the one or more processors, a second image captured by the camera at a second time;
  determining, by the one or more processors, that the vehicle position relative to the edge of the doorway satisfies second alert criteria based on the second image; and
  based on determining that the vehicle position relative to the edge of the doorway satisfies the second alert criteria, providing, by the one or more processors and to the signaling device installed in the garage, the second instruction that causes the signaling device to produce the audible alert for the driver of the vehicle.

* * * * *